US012254266B2

(12) United States Patent
De Oliveira et al.

(10) Patent No.: US 12,254,266 B2
(45) Date of Patent: Mar. 18, 2025

(54) METHODS, APPARATUSES AND COMPUTER PROGRAM PRODUCTS FOR PARSING TEMPORAL EXPRESSIONS IN A CONVERSATIONAL DATA-TO-TEXT SYSTEM

(71) Applicant: Arria Data2Text Limited, Aberdeen (GB)

(72) Inventors: Rodrigo Gomes De Oliveira, London (GB); John William Alexander, London (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 530 days.

(21) Appl. No.: 17/463,031

(22) Filed: Aug. 31, 2021

(65) Prior Publication Data
US 2022/0067276 A1    Mar. 3, 2022

Related U.S. Application Data

(60) Provisional application No. 63/072,576, filed on Aug. 31, 2020.

(51) Int. Cl.
*G06F 40/211* (2020.01)
*G06F 16/245* (2019.01)
(Continued)

(52) U.S. Cl.
CPC .......... *G06F 40/211* (2020.01); *G06F 16/245* (2019.01); *G06F 40/253* (2020.01); *G06F 40/30* (2020.01)

(58) Field of Classification Search
CPC .... G06F 40/211; G06F 16/245; G06F 40/253; G06F 40/30; G06F 16/3329; G06F 16/2477
See application file for complete search history.

(56) References Cited

U.S. PATENT DOCUMENTS 6,983,239 B1 * 1/2006 Epstein ................. G06F 40/216
                                                                  704/9
9,773,166 B1 * 9/2017 Connor ................. G06N 20/00
(Continued)

OTHER PUBLICATIONS

Angeli, G., Manning, C. D., & Jurafsky, D. (2012, June). Parsing time: Learning to interpret time expressions. In Proceedings of the 2012 Conference of the North American Chapter of the Association for Computational Linguistics: Human Language Technologies (pp. 446-455) (Year: 2012).*

(Continued)

*Primary Examiner* — Douglas Godbold
*Assistant Examiner* — Philip H Lam
(74) *Attorney, Agent, or Firm* — Alston & Bird LLP

(57) ABSTRACT

Embodiments provide for a temporal expression parser in a conversational data-to-text system are described herein. An example method may include receiving user query data comprising an input text string; generating, based at least in part on the input text string, a n-gram set comprising a plurality of n-gram elements; traversing each n-gram element in the n-gram set to generate a parse tree list comprising one or more parse trees based on a grammar template associated with the input text string; and generating, based at least in part on a last parse tree of the parse tree list, one or more semantic frames indicating a temporal expression associated with the input text string.

30 Claims, 10 Drawing Sheets

(51) Int. Cl.
*G06F 40/253* (2020.01)
*G06F 40/30* (2020.01)

(56) References Cited

U.S. PATENT DOCUMENTS

| | | | | |
|---|---|---|---|---|
| 10,121,467 | B1* | 11/2018 | Gandhe | G06F 40/247 |
| 10,956,680 | B1* | 3/2021 | Gupta | G06F 40/205 |
| 2008/0319947 | A1* | 12/2008 | Latzina | G06F 16/334 |
| 2009/0235280 | A1* | 9/2009 | Tannier | G06Q 10/00 |
| | | | | 719/318 |
| 2011/0196879 | A1* | 8/2011 | Robinson | G06F 16/334 |
| | | | | 707/E17.089 |
| 2012/0109637 | A1* | 5/2012 | Merugu | G06F 40/284 |
| | | | | 707/769 |
| 2014/0372102 | A1* | 12/2014 | Hagege | G06F 40/295 |
| | | | | 704/9 |
| 2016/0357851 | A1* | 12/2016 | Perkins | G06F 16/31 |
| 2017/0351754 | A1* | 12/2017 | Devarakonda | G06F 16/447 |
| 2018/0025075 | A1* | 1/2018 | Beller | G06F 16/3329 |
| | | | | 707/769 |
| 2018/0032610 | A1* | 2/2018 | Cameron | G10L 15/18 |
| 2019/0018833 | A1* | 1/2019 | Roychoudhury | G06F 40/211 |
| 2019/0095425 | A1* | 3/2019 | Galitsky | G06F 40/295 |

OTHER PUBLICATIONS

Saurí, R., Littman, J., Knippen, B., Gaizauskas, R., Setzer, A., & Pustejovsky, J. (2006). TimeML annotation guidelines. Version, 1(1), 31. (Year: 2006).*

Zhang, Y., & Xue, N. (2018). Neural ranking models for temporal dependency structure parsing. arXiv preprint arXiv:1809.00370. (Year: 2018).*

* cited by examiner

METHODS, APPARATUSES AND COMPUTER PROGRAM PRODUCTS FOR PARSING TEMPORAL EXPRESSIONS IN A CONVERSATIONAL DATA-TO-TEXT SYSTEM

CROSS-REFERENCE TO RELATED APPLICATIONS

The present application claims priority to U.S. Provisional Application Ser. No. 63/072,576, titled "PARSING TEMPORAL EXPRESSIONS IN A CONVERSATIONAL DATA-TO-TEXT SYSTEM," filed Aug. 31, 2020, the contents of which are incorporated herein by reference in their entirety.

TECHNOLOGICAL FIELD

Embodiments of the present disclosure relate generally to natural language querying technologies and, more particularly, related to methods, apparatuses, and computer program products for providing a temporal expression parser in a conversational data-to-text system.

BACKGROUND

In the present disclosure, the term "temporal expression" or "timex" refers to a text (such as a character, a word, a number, etc.) or a sequence of texts (such as characters, words, numbers, one or more phrases, one or more sentences, etc.) that denote a temporal entity or time, including, but not limited to, a time point (for example, September 22, 2019), a time interval (for example, from September 2019 to October 2019), a variance period (for example, a month to month comparison). For example, the following temporal expression indicates a time point:

September 22, 2019

Many methods and systems fail to overcome technical challenges associated with recognizing and/or parsing temporal expressions from a query. For example, many computer systems fail to parse temporal expressions that are not contiguous. As an example, the following temporal expression indicates a time interval, even though the expression that indicates the beginning time point ("beginning time point expression") and the expression that indicates the ending time point ("ending time point expression") are not contiguous:

From 9:00 to no later than 11:00

In the above example, the beginning time point expression (e.g., 9:00) and the ending time point expression (e.g., 11:00) are interrupted by other expressions (e.g., "no later than"). Many systems fail to recognize that the above example indicates a time interval at least due to the interruption that causes the beginning time point expression and the ending time point expression to be not contiguous.

In addition, many systems parse temporal expressions incorrectly or incompletely because of their technical limitations. For example, the following expression indicates a time duration from September 2019 to October 2019:

Sept to Oct 2019

Many systems may parse the above expression as having a beginning time point expression of XXXX-09-01 and an ending time point expression of 2019-10-1, which is incomplete because the beginning time point expression misses the year (e.g., 2019). As another example, the following expression indicates a time interval between September 2019 to October 2019:

Oct 2019 back to Sep 2019

Many systems may incorrectly parse the above expression as indicating a beginning time point expression of October 2019 due to the text sequence "Oct 2019" occur before the text sequent "Sep 2019).

BRIEF SUMMARY

In general, embodiments of the present disclosure provide methods, apparatus, systems, computing devices, and/or the like for providing a temporal expression parser. In some embodiments, the temporal expression parser may be implemented in a conversational data-to-text system.

In accordance with examples of the present disclosure, an apparatus is provided. The apparatus may comprise at least one processor and at least one non-transitory memory comprising program code, the at least one non-transitory memory and the program code configured to, with the at least one processor, cause the apparatus to at least: receive user query data comprising an input text string; generate, based at least in part on the input text string, a n-gram set comprising a plurality of n-gram elements; traverse each n-gram element in the n-gram set to generate a parse tree list comprising one or more parse trees based on a grammar template associated with the input text string; and generate, based at least in part on a last parse tree of the parse tree list, one or more semantic frames indicating a temporal expression associated with the input text string.

In some embodiments, prior to traversing each n-gram element in the n-gram set, the at least one non-transitory memory and the program code are configured to, with the at least one processor, cause the apparatus to further: retrieve, from a grammar database, the grammar template corresponding to the input text string, wherein the grammar template defines a grammar structure associated with the input text string.

In some embodiments, the grammar template is a context-free grammar.

In some embodiments, an arrangement of the plurality of n-gram elements in the n-gram set is determined based on a location of each n-gram element with respective to the input text string and a size of each n-gram element.

In some embodiments, the at least one non-transitory memory and the program code are configured to, with the at least one processor, cause the apparatus to traverse each n-gram element in the n-gram set according to the arrangement of the plurality of n-gram elements.

In some embodiments, when traversing each n-gram in the n-gram set to generate the parse tree list, the at least one non-transitory memory and the program code are configured to, with the at least one processor, cause the apparatus to further: determine, for a n-gram element in the n-gram set, whether the grammar template defines a corresponding parse tree for the n-gram element; based on determining that the grammar template defines the corresponding parse tree for the n-gram element, add the corresponding parse tree to the parse tree list.

In some embodiments, the last parse tree of the parse tree list is defined by the grammar template for a largest n-gram element within the n-gram set.

In some embodiments, the last parse tree comprises a plurality of nodes generated based on the grammar template. In some embodiments, when generating the one or more semantic frames, the at least one non-transitory memory and the program code are configured to, with the at least one processor, cause the apparatus to further: remove at least one node from the last parse tree that represents at least one stop word; and join a pair of non-contiguous nodes in the last parse tree that represent temporal words.

In some embodiments, when generating the one or more semantic frames, the at least one non-transitory memory and the program code are configured to, with the at least one processor, cause the apparatus to further: determine, based on the grammar template, whether the last parse tree corresponds to a time point, a time interval, or a variance period.

In some embodiments, the at least one non-transitory memory and the program code are configured to, with the at least one processor, cause the apparatus to further: in response to determining that the last parse tree corresponds to the time point: normalize each node of the last parse tree; and add at least one inferred node to the last parse tree based on a current time descriptor and a temporal granularity descriptor associated with the input text string.

In some embodiments, the at least one non-transitory memory and the program code are configured to, with the at least one processor, cause the apparatus to further: in response to determining that the last parse tree corresponds to the time interval: normalize each node of the last parse tree; add at least one inferred node to the last parse tree based on a current time descriptor and a temporal granularity descriptor associated with the input text string; and arrange a first node of the last parse tree that represents a first time point and a second node of the last parse tree that represents a second time point.

In some embodiments, the at least one non-transitory memory and the program code are configured to, with the at least one processor, cause the apparatus to further: in response to determining that the last parse tree corresponds to the variance period: determine a first node of last parse tree that represents a current interval based on a current time descriptor; and determine a second node of the last parse tree that represents a comparison interval based on the current interval, wherein the comparison interval represents a same interval length as the current interval.

In accordance with examples of the present disclosure, a computer-implemented method is provided. The computer-implemented method comprises receiving user query data comprising an input text string; generating, based at least in part on the input text string, a n-gram set comprising a plurality of n-gram elements; traversing each n-gram element in the n-gram set to generate a parse tree list comprising one or more parse trees based on a grammar template associated with the input text string; and generating, based at least in part on a last parse tree of the parse tree list, one or more semantic frames indicating a temporal expression associated with the input text string.

In accordance with examples of the present disclosure, a computer program product is provided. The computer program product comprises at least one non-transitory computer-readable storage medium having computer-readable program code portions stored therein. The computer-readable program code portions comprise an executable portion configured to: receive user query data comprising an input text string; generate, based at least in part on the input text string, a n-gram set comprising a plurality of n-gram elements; traverse each n-gram element in the n-gram set to generate a parse tree list comprising one or more parse trees based on a grammar template associated with the input text string; and generate, based at least in part on a last parse tree of the parse tree list, one or more semantic frames indicating a temporal expression associated with the input text string.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
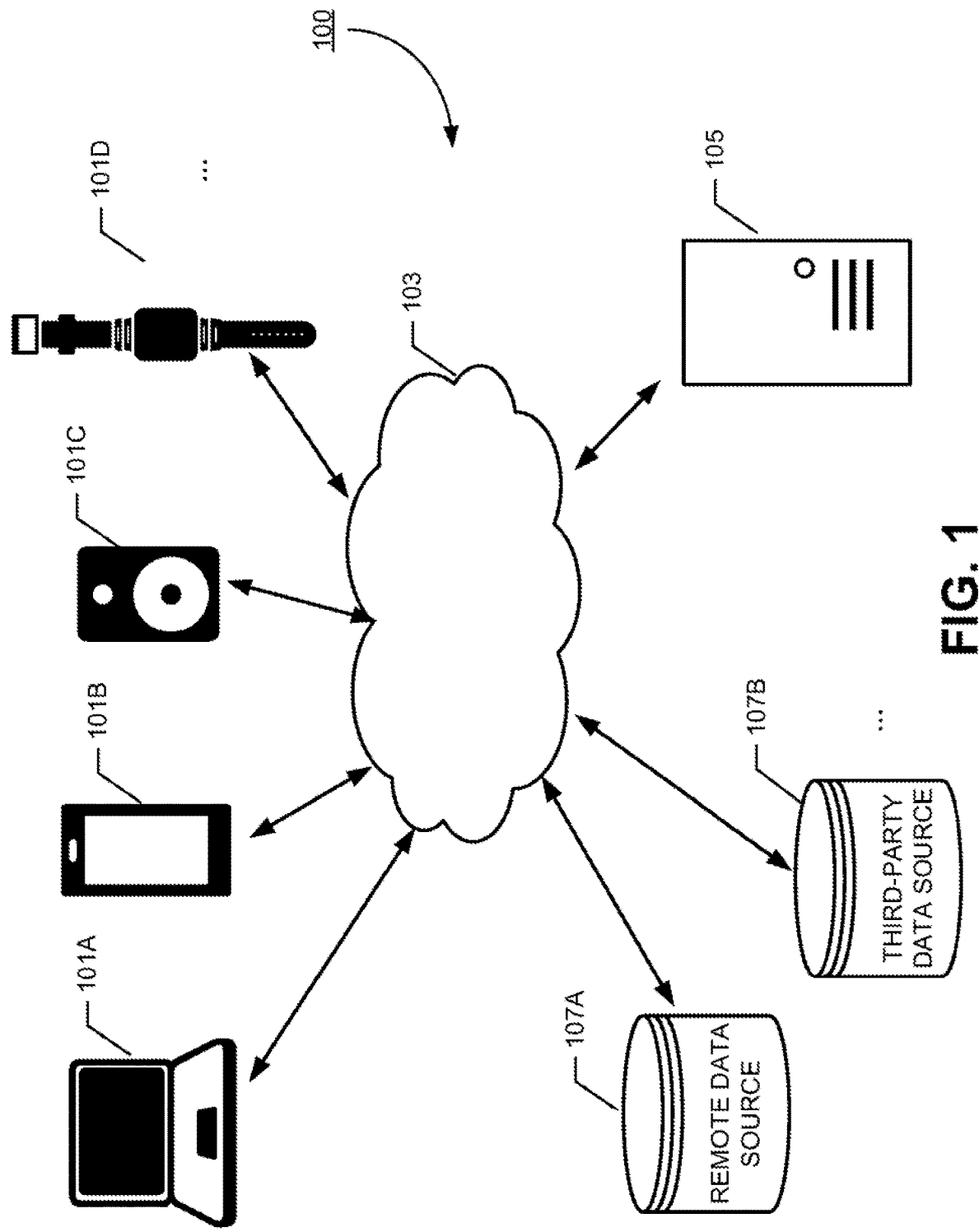
Figure 2:
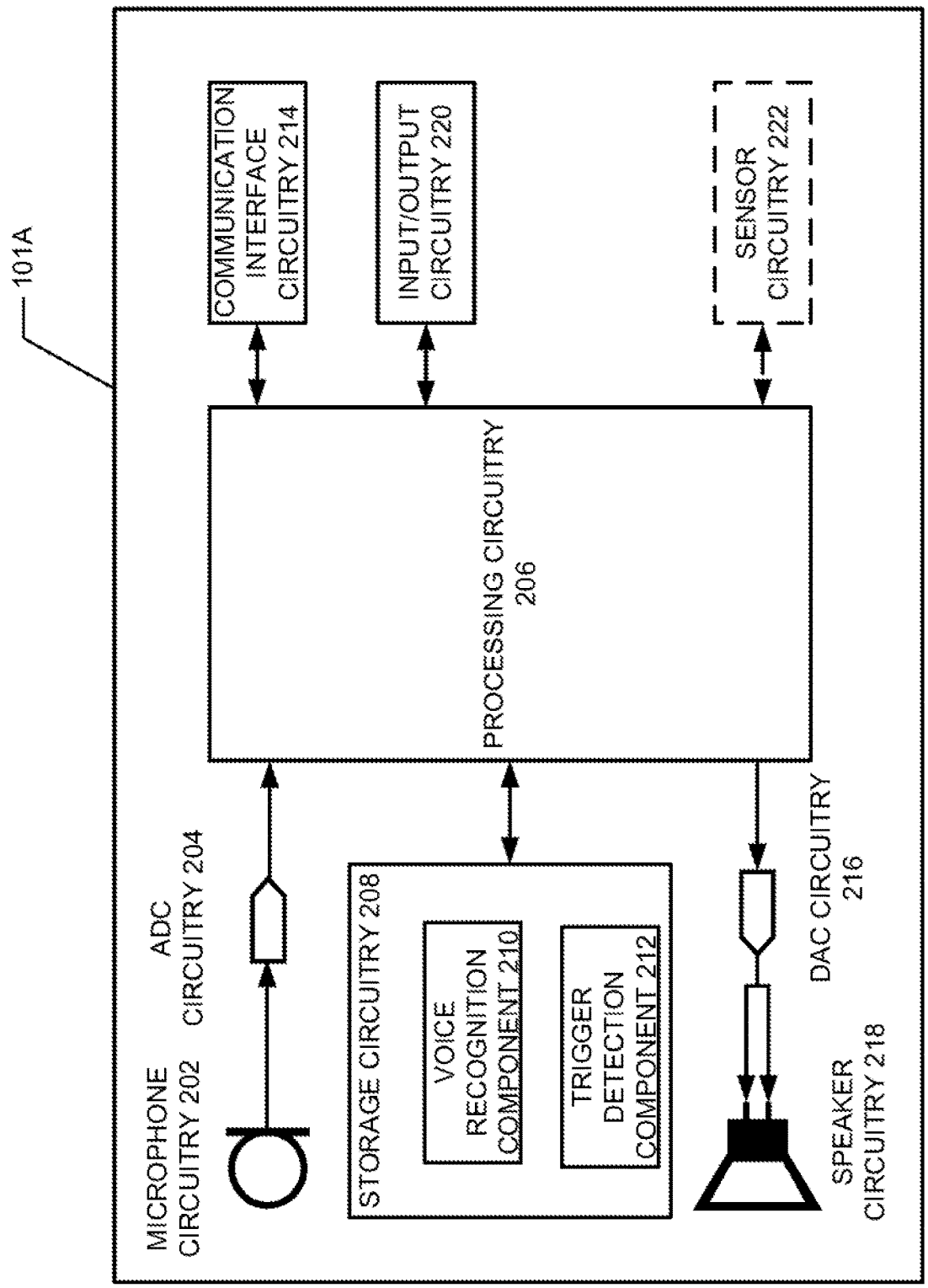
Figure 3:
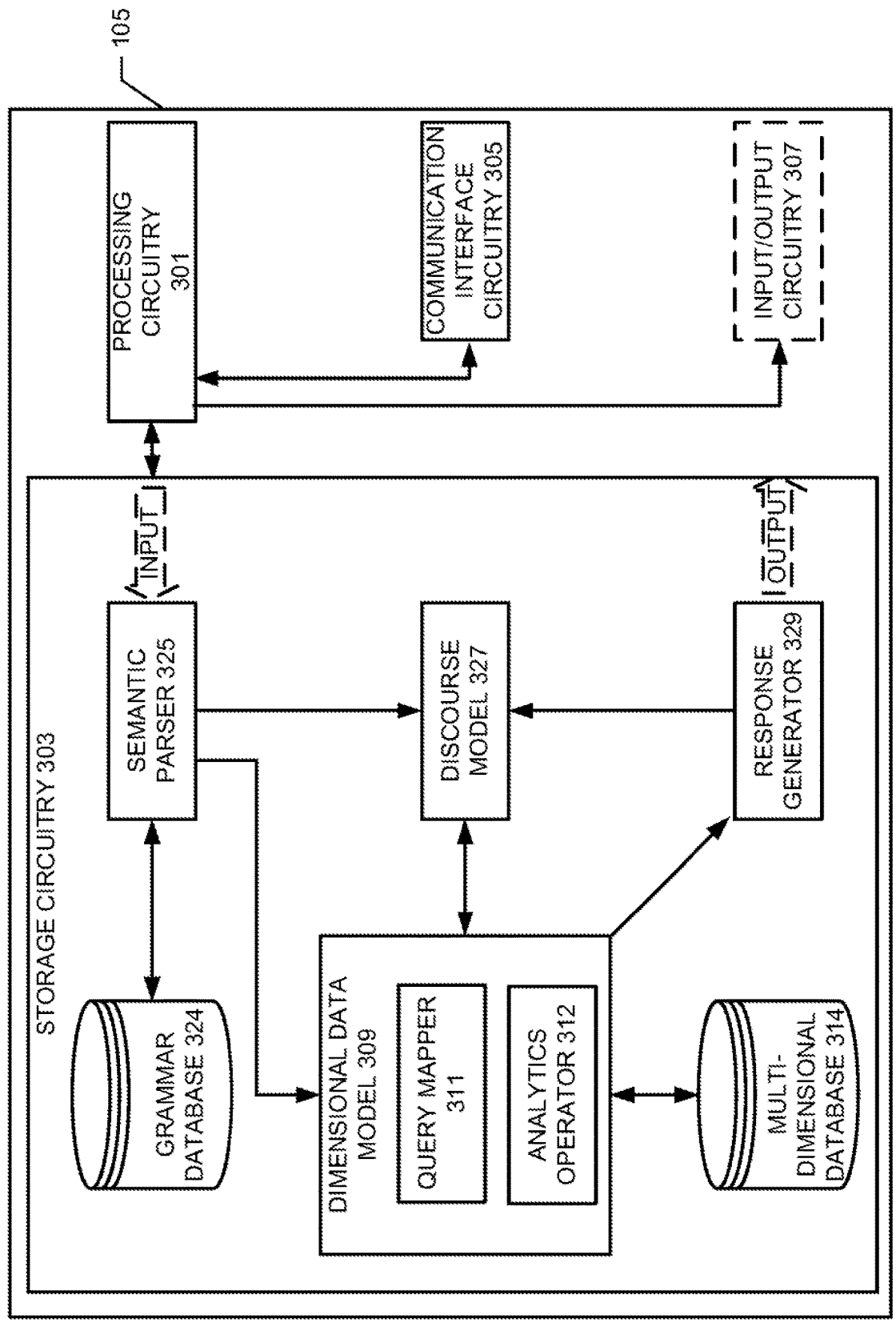
Figure 4:
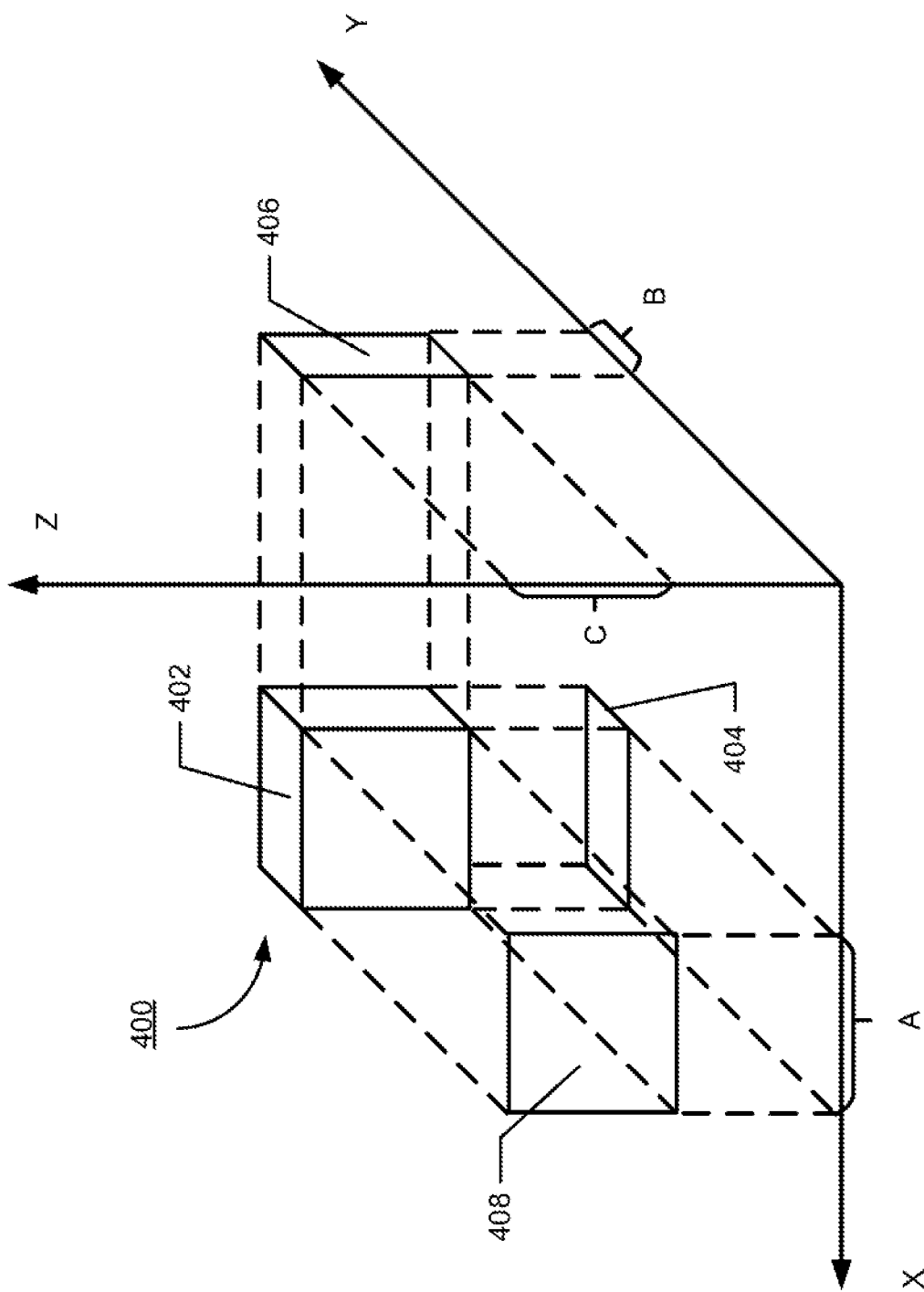
Figure 5A:
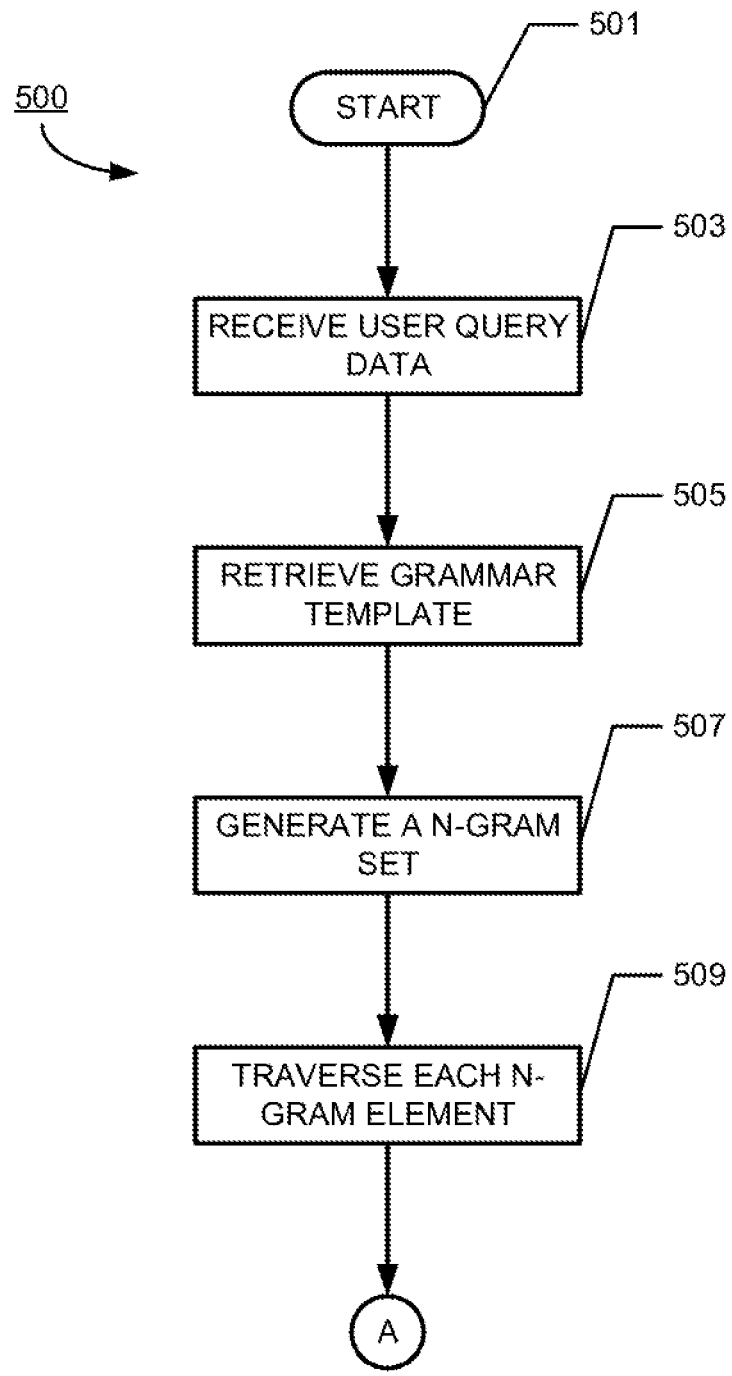
Figure 5B:
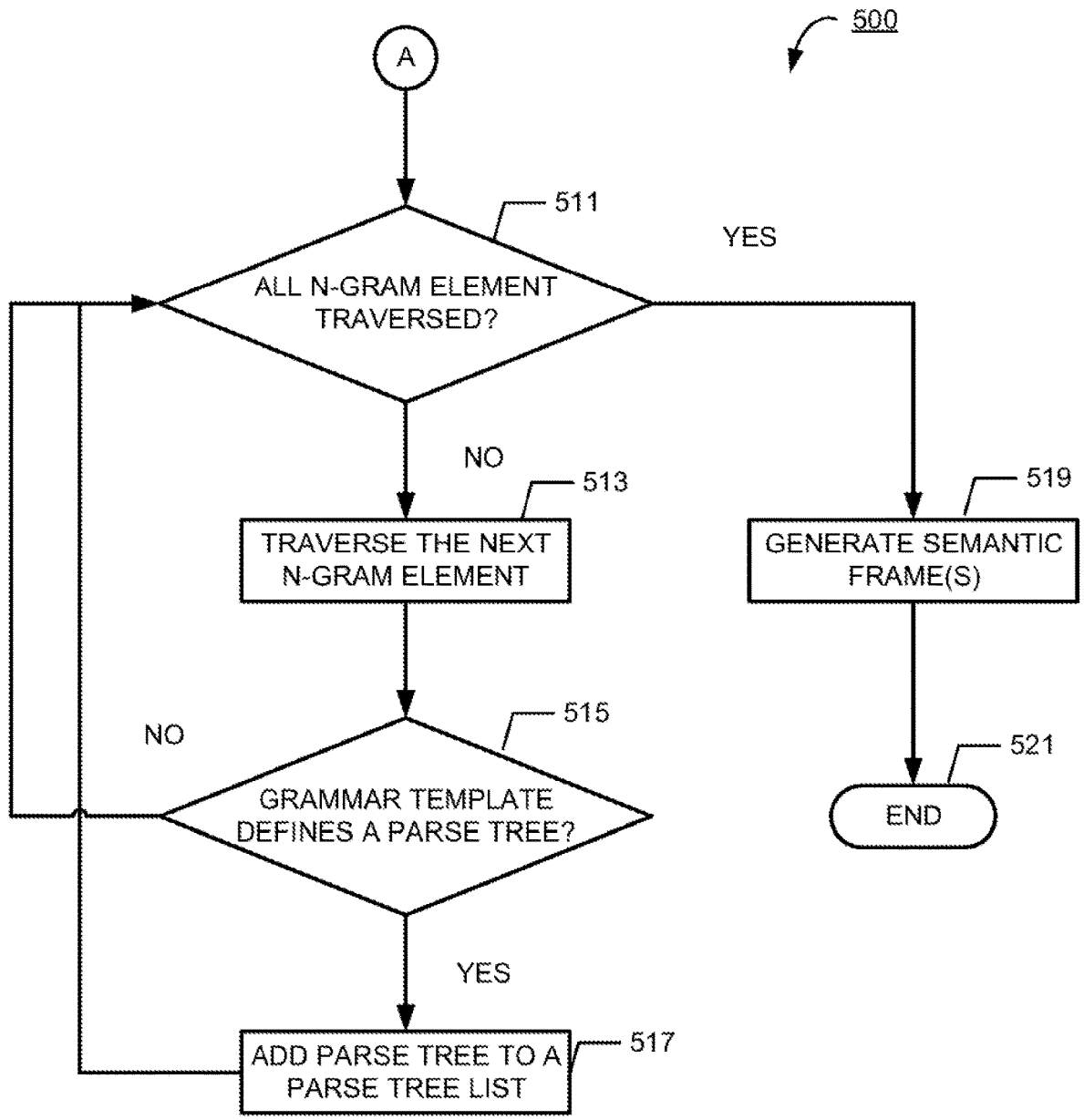

Having thus described some embodiments in general terms, references will now be made to the accompanying drawings, which are not necessarily drawn to scale, and wherein:

FIG. 1 is an example system architecture diagram illustrating an conversational language interaction environment in accordance with some embodiments of the present disclosure;

FIG. 2 is an example infrastructure diagram illustrating an example client device in accordance with some embodiments of the present disclosure;

FIG. 3 is an example infrastructure diagram illustrating an example conversational data-to-text system in accordance with some embodiments of the present disclosure;

FIG. 4 illustrates an example multi-dimensional data object in accordance with some embodiments of the present disclosure;

FIG. 5A and FIG. 5B illustrate example methods in accordance with some embodiments of the present disclosure; and FIG. 6A, FIG. 6B, FIG. 6C, and FIG. 6D illustrate example methods in accordance with some embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to natural language query systems. More specifically, various embodiments of the present disclosure are related to a conversational data-to-text system that, in some examples, may resolve one or more tasks, engage in one or more extended conversations, and/or present insights derived from data (including multi-dimensional data objects) in the form of natural language response(s).

In the present disclosure, the terms "conversational system," "dialogue system," "conversational agents" refer to a computing system or device with which a human being (e.g., a user) may communicate, converse and/or interact. In some embodiments, communications, conversations and/or interactions between an example conversational system and a human being may be conducted in natural language (e.g., a language that has developed naturally in use such as English, Standard Mandarin, etc.). A dialogue system may be classified based on its objective(s) or goal(s). For example, a dialogue system may be a "task-orientated dialogue system," which may resolve one or more tasks and/or execute one or more actions after receiving instructions (in the form of natural language) from a user. For example, an example task-orientated dialogue system may provide driving directions to a user, changing setting(s) of Internet of Things (IoT) devices (such as smart thermostats) based on user's instructions, and/or the like. As another example, a dialogue system may be a "chatbot." A "chatbot" may engage in an extended conversation with a user (such as by mimicking an unstructured conversation or "chats" characteristic of human-human interactions).

In the present disclosure, the term "data-to-text system" refers to a computer system that may generate output data (such as, but not limited to, written texts, graphics, and/or the like) based on input data (including linguistic input and/or non-linguistic input) received from a user. For example, an example data-to-text system may analyze and interpret non-linguistic data received as input data, and may generate an output text by deriving insights from a dataset based on querying the dataset using the received non-linguistic data.

In the present disclosure, the term "conversational data-to-text system" refers a computing system that may combine various features and elements of dialogue systems (including task-orientated dialogue systems and chatbots) and data-to-text systems. In some examples, an example conversational data-to-text system may overcome many technical challenges associated dialogue systems and data-to-text systems.

For example, data-driven decision making may be fundamental to the success of many institutions and enterprises. A conversational data-to-text system may, in some examples, increase decision making efficiency by allowing users to verbally query for a specific insight, without having to read (or listen to) an entire report, by narrowing the gap between end users and data (such as by allowing non-technical users to use conversational natural language to query data).

In many examples, datasets that yield useful insights may be multi-dimensional. For example, data objects in an example dataset may be split or categorized based on countries, product type, quarters, etc. Analyzing multi-dimensional data can be a complex task, at least due to technical complexity in choosing one or more applicable operations from various possible query operations, such as, but not limited to, grouping (e.g., by country, product, quarter, etc.), filtering (e.g., for Canada, Coca-Cola, Q1, etc.), variance (e.g., Q1 vs Q2 sales, drivers and offsets, etc.). To accomplish such a complex task, an example conversational data-to-text system may, in some examples, programmatically extract insights from multi-dimensional datasets in natural language.

In addition, an example conversational data-to-text system in accordance with embodiments of the present disclosure may be multi-turn based instead of single-turn based. In the present disclosure, the term "single-turn based" refers to a system that generates a signal response (for example, a report) in response to a signal request or input from a user (for example, pressing a button). The term "multi-turn based" refers to a system that may generate a response (for example, an answer) in response to several requests or inputs from a user (for example, multiple questions received from a user). A multi-turn interaction provided by an example conversational data-to-text system may enable more flexibility in user interaction, as it allows users (such as analysts) to direct the insight harvesting process, rather than being constrained to the insights within a single-shot report.

Further, it may be challenging to produce a system that is generic enough to work with a large variety of datasets (such as within the business intelligence/natural language query (BI/NLQ) domain), in comparison with a system that is specific to a singular dataset or data source. An example conversational data-to-text system in accordance with examples of the present disclosure may retrieve datasets from multiple domains and/or in multi-dimensional format, such that the example conversational data-to-text system may be generic enough to answer a large variety of possible questions that cover a large number of possible datasets.

In addition to overcoming various technical challenges (such as those described above), an example conversational data-to-text system in accordance with embodiments of the present disclosure may provide various technical benefits.

Specifically, and by way of example, the example conversational data-to-text system disclosed herein is configured to enable conversation between a user and a dataset in the form of a question and answer exchange. In some examples, the conversation may begin with a question received from a user and is processed by way of a natural language understanding component (such as a query mapper) of the example conversational data-to-text system, whereas in others the conversation may begin based on an output of a response generator of the example conversational data-to-text system. In both cases, the response generator is configured to generate an output response in the form of such as, but not limited to, written text(s), which may be converted into audio data (such as, but not limited to, voice, sound, and/or the like) by the example conversational data-to-text system or by an example client device. In some examples, a user may continue the conversation by interacting with the output response, such as by way of a question, a query, by selecting an item in the text or the like. In such cases, the example conversational data-to-text system processes the question, the query, and/or the selection, and generates an output, thereby enabling, in some examples, an extended conversation between the conversational data-to-text system and the user.

By way of further example, various embodiments of the present disclosure may maintain a model of the current state of the conversation (e.g., a discourse model), such that a human being may communicate effectively with a conversational data-to-text system. The discourse model may be relied on by the conversational data-to-text system to both analyze dataset and generate output correctly and fluidly. In some embodiments, the discourse model may provide contextual information to the conversation and allow for features such as, but not limited to, using referring expressions, resolving underspecified entities, and occluding or omitting repeating information. In some embodiments, contextual information may come form not only the conversational history, but also relationships between data entities (e.g., an understanding that date entities may form a hierarchy). As such, an example conversational data-to-text system may analyze both types of contextual information in generating an output.

As another example, an example conversational data-to-text system in accordance with examples of the present disclosure may transform expressions in natural language text into formal meaning representations (e.g., "semantic frames") such that the conversational data-to-text system may properly extract and interpret a query from a user, analyze dataset, and properly generate text. In some embodiments, a temporal expression that denotes a temporal entity or time can be a complex entity to represent (e.g., dimension, extension, direction, granularity, etc.), and natural language may add several more layers of complexity (e.g., underspecification, elision, distance, etc.). An example conversational data-to-text system may comprise a semantic parser that may extract and interpret a temporal expression within a query received from a user, even if the query may not have contiguous words that would normally indicate a temporal expression, so that the temporal expression may be correctly and accurately transform into semantic frames.

As such, various embodiments of the present disclosure may provide a conversational data-to-text system that may accomplish tasks of providing insights in natural language based on translating natural language queries into relevant data query operations (e.g., filtering, retrieving a mean, variance analysis, etc.), engaging in an extended conversation by answering multiple queries in succession and utilizing information from previous queries (if applicable), and/or being generic enough to handle a large variety of datasets from multiple domains.

Example System Architecture

FIG. 1 is an example block diagram of example components of an example conversational environment 100. In the example shown in FIG. 1, the conversational environment 100 may comprise various components, such as, but not limited to, one (or more) conversational data-to-text system 105, one or more client devices 101A, 101B, 101C, 101D, . . . and one or more networks 103. In some embodiments, the conversational environment 100 may comprise one or more data storage devices (such as data storage devices 107A, 107B, . . . ).

Each of the example components of the example conversational environment 100 may be in electronic communication with, for example, one another over the same or different networks 103.

For example, users may communicate, converse and/or interact with the conversational data-to-text system 105 via one or more networks (such as one or more networks 103) using one or more client devices (such as client devices 101A, 101B, 101C, 101D, . . . . The client devices 101A, 101B, 101C, 101D, . . . may be a computing device. For example, the client devices 101A, 101B, 101C, 101D may include desktop computers, laptop computers, tablet computers, smartphones, wearables, smart speakers, smart televisions, smart home appliances (including, but not limited to, smart refrigerators, smart washer, smart dryer), voice controllers, devices with integrated intelligent virtual assistant (IVA) or intelligent personal assistant (IPA), and/or the like. An example infrastructure diagram of an example client device is illustrated in FIG. 2 and described in detail herein.

In some embodiments, a user may communicate, converse and/or interact with the conversational data-to-text system 105 by providing voice, sound, and/or other types of audio data. For example, the client device 101A may comprise a microphone circuitry that may detect and/or capture audio data from the environment surrounding the client device 101A. The client device 101A may analyze audio data, convert applicable audio data to user query data, and transmit the user query data to the conversational data-to-text system 105.

In some embodiments, the client device 101A may analyze audio data to determine whether the use has triggered, requested, and/or prompted communication, conversation and/or interaction with the conversational data-to-text system 105. For example, by analyzing the audio data, the client device 101A may determine that a user has spoken a trigger word or phrase that indicates a request to communicate, converse and/or interact with the conversational data-to-text system 105. Subsequently, the client device 101A may convert the audio data into query data, and may transmit the query data to the conversational data-to-text system 105.

In some embodiments, a user may communicate, converse and/or interact with the conversational data-to-text system 105 by inputting text and/or other types of non-audio data to a client device. For example, the client device 101A may comprise an input/output circuitry (for example, a keyboard, a mouse, etc.) that may allow a user to provide non-audio data to the client device 101A (for example, by typing or selecting a request to communicate, converse and/or interact with the conversational data-to-text system 105). Based on the non-audio data, the client device 101A may generate user query data, and transmit the user query data to the conversational data-to-text system 105.

In some embodiments, communication, conversation and/or interaction between a user (via a client device) and the conversational data-to-text system 105 may be triggered, promoted, and/or directed based on one or more triggering events. For example, the client device may comprise one or more sensor circuitries, such as, but not limited to, one or more touch sensors, one or more accelerometers, one or more gyroscopes, one or more pressure sensors, one or more capacitive sensors and/or the like. As an example, the client device 101B may be in the form of a mobile device that comprises a physical button and a pressure sensor electronically coupled to the physical button. Based on detecting that a user has pressed the physical button for a time duration longer than a predetermined time period, the client device 101B may trigger a microphone circuitry to detect and/or capture audio data, and/or trigger an input/output circuitry to detect and/or capture non-audio data. Subsequently, the client device 101B may convert the audio data and/or non-audio data into user query data, and may transmit the user query data to the conversational data-to-text system 105.

While the description above provides some examples of initiating, triggering, and conducting communication, conversation, and/or interaction between a user and the conversational data-to-text system 105, it is noted that the scope of the present disclosure is not limited to the description above. In some examples, communication, conversation, and/or interaction may be initiated, triggered, and/or conducted additionally or alternatively through other means or mechanisms.

Referring back to FIG. 1, the one or more networks 103 may include, but are not limited to, any one or a combination of different types of suitable communications networks. Such networks may include, but not limited to, a wired or wireless local area network (LAN), personal area network (PAN), metropolitan area network (MAN), wide area network (WAN), or the like, as well as any hardware, software and/or firmware required to implement it (such as, e.g., network routers, etc.).

For example, one or more networks 103 may include an 802.11, 802.16, 802.20, and/or WiMax network. The one or more networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. The one or more networks 103 may include a public network (such as the Internet), a private network (such as an intranet), or combinations thereof, and may utilize a variety of networking protocols including, but not limited to, TCP/IP based networking protocols. As an example, the networking protocol may be customized to suit the needs of the conversational data-to-text system 105. In some embodiments, the protocol may be a custom protocol of JSON objects sent via a WebSocket channel. In some embodiments, the protocol may be JSON over RPC, JSON over REST/HTTP, and the like.

In some embodiments, data and/or information (such as, but not limited to, user query data) may be sent to the conversational data-to-text system 105 via, for example, the one or more networks 103 directly by one or more client devices 101A, 101B, 101C, 101D Additionally, or alternatively, these data and/or information may be sent to the conversational data-to-text system 105 by a client device and via one or more intermediaries (such as another client device).

In various embodiments of the present disclosure, the conversational data-to-text system 105 may comprise one or more hardware components (such as circuitries) and software components (such as software systems/modules) that may be configured to generate one or more output responses based on user query data received by the conversational data-to-text system 105 (for example, user query data that is generated by and transmitted from one or more client devices 101A, 101B, . . . ), additional details of which are described herein.

In the example shown in FIG. 1, the example conversational environment 100 may comprise one or more data storage devices (such as data storage devices 107A, 107B, . . . ) in electronic communications with the conversational data-to-text system 105. For example, the data storage device 107A may provide remote data sources (e.g., remote reference data, remote user data, and/or the like). The data storage device 107B may provide third-party data sources (for example, data stored in a database that is external to the conversational data-to-text system 105). Additionally, or alternatively, the example conversational environment 100 may comprise more (or less) data storage devices as compared to those shown in the example of FIG. 1.

In some embodiments, the conversational data-to-text system 105 may transmit one or more output responses to a client device (such as one of the one or more client devices 101A, 101B, 101C, 101D . . . ) through the one or more networks 103. Additionally, or alternatively, one or more output responses may be transmitted to a client device through the one or more networks 103 and via one or more intermediaries (such as another client device).

In some embodiments, subsequent to receiving the output response(s), a client device may convert the output response(s) into audio data, and may output the audio data through a speaker circuitry. Additionally, or alternatively, client device may convert the output response(s) into non-audio data (such as, but not limited to, written texts, graphics, and/or the like), and may render the non-audio data for display through a display circuitry.

As such, in various example embodiments of the present disclosure, communication, conversation, and/or interaction between a user and the conversational data-to-text system 105 may be initiated, triggered, and/or conducted based at least on the user providing audio data (for example, speaking into a client device) and/or non-audio data (for example, typing into the client device). The user may receive an output response from the conversational data-to-text system 105 (that may be converted into audio data and/or non-audio data as described above), and may continue the communication, conversation, and/or interaction by providing additional audio data and/or non-audio data (and receiving additional output responses from the conversational data-to-text system 105).

While the description above provides an example architecture of an example conversational environment, it is noted that the scope of the present disclosure is not limited to the description above. In some examples, an example conversational environment may comprise one or more additional and/or alternative elements. For example, while FIG. 1 illustrates certain devices as separate, standalone entities, the various embodiments of the present disclosure are not limited to this particular architecture.

Example Client Device

FIG. 2 provides an illustrative schematic representative of a client device 101A that can be used in conjunction with embodiments of the present disclosure.

In the example shown in FIG. 2, the client device 101A may include one or more components, such as, but not limited to, a processing circuitry 206, a storage circuitry 208, a communication interface circuitry 214.

In some embodiments, the client device 101A may optionally include a microphone circuitry 202 and an analog-to-digital converter (ADC) circuitry 204. In some embodiments, the client device 101A may optionally include a speaker circuitry 218 and a digital-to-analog converter (DAC) circuitry 216. In some embodiments, the client device 101A may optionally include an input/output circuitry 220. In some embodiments, the client device 101A may optionally include a sensor circuitry 222.

In embodiments where the client device 101A comprises the microphone circuitry 202, the microphone circuitry 202 may comprise one or more sensors, transducers, and/or signal detecting apparatuses that may be configured to detect and/or capture acoustic signal(s) (for example, acoustic waveform(s)) that represent audio data. Examples of the microphone circuitry 202 may include, but not limited to, a piezoelectric microphone, a micro-electrical-mechanical system (MEMS) microphone, a large diaphragm condenser microphone, a small diaphragm condenser microphone, a carbon microphone, a liquid microphone, an electret condenser microphone, a dynamic microphone, and/or the like. For example, the microphone circuitry 202 may detect acoustic signal(s) from the environment surrounding the client device 101A, which may include, for example, user's voice or sound made by a user.

In some embodiments, the microphone circuitry 202 may be electronically coupled to the ADC circuitry 204. The ADC circuitry 204 may convert acoustic signal(s) to digital signal(s). Examples of the ADC circuitry 204 may include, but not limited to, flash ADC, successive-approximation register ADC, and/or the like. For example, the ADC circuitry 204 may convert acoustic waveforms into audio data that can be processed by the processing circuitry 206.

While the description above provides an example of the microphone circuitry 202 being electronically coupled to the ADC circuitry 204, it is noted that the scope of the present disclosure is not limited to the description above. In some embodiments, the microphone circuitry 202 may comprise an integrated ADC circuitry within the microphone circuitry 202, such that a separate ADC circuitry is not required.

In the example shown in FIG. 2, the ADC circuitry 204 (or the microphone circuitry 202 having an integrated ADC circuitry) is electronically coupled to the processing circuitry 206, and may transmit audio data to the processing circuitry 206.

The processing circuitry 206 may be embodied in a number of different ways and may, for example, include one or more same or different processing devices configured to perform independently or jointly. For example, the processing circuitry 206 may be embodied as one or more complex programmable logic devices (CPLDs), microprocessors, multi-core processors, coprocessing entities, application-specific instruction-set processors (ASIPs), and/or controllers. Further, the processing circuitry 206 may be embodied as one or more other processing devices or circuitry. The term circuitry may refer to an entirely hardware embodiment or a combination of hardware and computer program products. Thus, the processing circuitry 206 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 206 may be configured for a particular use or configured to execute instructions stored in one or more storage circuitries (such as, but not limited to, one or more memories, one or more volatile or non-volatile computer-readable storage mediums and/or one or more data repositories that are accessible to the processing circuitry 206). As such, whether configured by hardware or computer program products, or by a combination thereof, the processing circuitry 206 may be capable of performing steps or operations according to embodiments of the present disclosure when configured accordingly. In some embodiments, the processing circuitry 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

Referring to FIG. 2, the processing circuitry 206 may be electronically coupled to the storage circuitry 208, such that the processing circuitry 206 may be configured to execute instructions stored in the storage circuitry 208.

The storage circuitry 208 may be embodied in a number of different ways and may, for example, include one or more same or different data storage devices configured to perform independently or jointly. For example, the storage circuitry 208 may comprise one or more volatile computer-readable storage mediums. In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like.

Additionally, or alternatively, the storage circuitry 208 may comprise one or more non-volatile computer-readable storage mediums. In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. Additionally, or alternatively, a non-volatile computer-readable storage medium may include compact disc read only memory (CD-ROM), compact disc-rewritable (CD-RW), digital versatile disc (DVD), Blu-ray disc (BD), any other non-transitory optical medium, and/or the like. Additionally, or alternatively, a non-volatile computer-readable storage medium may include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Additionally, or alternatively, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

It will be appreciated that, where embodiments are described to use a computer-readable storage medium, other types of computer-readable storage media may be substituted for or used in addition to the computer-readable storage media described above.

In accordance with various embodiments of the present disclosure, one or more computer program products may be installed and/or stored in a storage circuitry. Example computer program products may include, but not limited to, software components such as one or more software components, applications, software objects, methods, data structures, and/or the like.

In the present disclosure, a software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution. Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

In the example shown in FIG. 2, a voice recognition component 210 and/or a trigger detection component 212 may be stored in the storage circuitry 208. In some embodiments, the voice recognition component 210 may comprise one or more software components that are configured to determine whether audio data (for example, received from the microphone circuitry 202 and/or the ADC circuitry 204) comprises data/information that represents a human voice, and/or the identity of the voice (e.g., whom the voice is originated from). For example, the voice recognition component 210 may comprise algorithms, such as, but not limited to, classification-based algorithms (e.g., algorithms based on Mel frequency cepstral coefficients (MFCC) and/or linear prediction cepstral coefficients (LPCC)). Additionally, or alternatively, the voice recognition component 210 may implement one or more machine learning models, such as, but not limited to, artificial neural network (ANN), vector quantization (VQ), and/or dynamic time warping (DTW).

If the voice recognition component 210 determines that the audio data comprises data/information that represents a human voice, and/or the identity of the voice corresponds to an authorized user of the client device 101A, the voice recognition component 210 may transmit the audio data to the trigger detection component 212. The trigger detection component 212 may comprise one or more software components that are configured to determine whether the audio data comprises data/information that represents a trigger word, a trigger phrase, a trigger sentence, and/or a trigger audio sequence that indicates a user's request to communicate, converse and/or interact with a conversational data-to-text system (for example, the conversational data-to-text system 105 shown above in connection with FIG. 1). For example, the voice recognition component 210 may comprise machine learning algorithms, such as, but not limited to, deep neural network (DNN). As an example, the DNN may calculate a plurality of trigger scores based on the audio data and determine whether these trigger scores satisfy one or more threshold values and/or conditions. Based on one or more of the plurality of trigger scores satisfying the one or more threshold values and/or conditions, the trigger detection component 212 may determine that the audio data comprises data/information that represents a trigger word, a trigger phrase, a trigger sentence, and/or a trigger audio sequence.

Based on determining that the audio data comprises data/information indicating a user's request to communicate, converse and/or interact with a conversational data-to-text system, the processing circuitry 206, in communication with the storage circuitry 208, may convert the audio data into user query data, and cause the communication interface circuitry 214 to transmit the user query data to a conversational data-to-text system (for example, the conversational data-to-text system 105). For example, the processing circuitry 206 may execute one or more algorithms and/or models that may convert and/or translate audio data into user query data in the form of text (for example, a speech-to-text algorithm that converts an audio recording to a natural language expression that corresponds to text of the audio recording). For example, the processing circuitry 206 may execute an algorithm based on the Hidden Markov Models (HMM) s. In such an example, the HMMs may model time-varying spectral vector sequences based on the audio data. Additionally, or alternatively, the processing circuitry 206 may generate text using other algorithms and/or models, such as, but not limited to, machine learning models (e.g., ANN, VQ, DTW, and/or the like).

Based on determining that the audio data comprises data/information not indicating a user's request to communicate, converse and/or interact with a conversational data-to-text system, the processing circuitry 206, in communication with the storage circuitry 208, may discard or delete the audio data.

While the description above provides some example software modules stored in the storage circuitry 208, it is noted that the scope of the present disclosure is not limited to the description above. In some examples, an example storage circuitry 208 may comprise one or more additional and/or alternative software modules.

Further, while the description above provides an example of a user triggering, requesting, and/or conducting communication, conversation and/or interaction with an example conversational data-to-text system through audio, it is noted that the scope of the present disclosure is not limited to this example only. Additionally, or alternatively, a user may trigger, request, and/or conduct communication, conversation and/or interaction with the conversational data-to-text system 105 through non-audio means.

For example, in some embodiments of the present disclosure, the client device 101A may include an input/output circuitry 220. Examples of input/output circuitry 220 may include, but is not limited to, a display circuitry (including, but is not limited to, a cathode ray tube (CRT) display, a liquid crystal display LCD (LCD), a Light-emitting diode (LED) display, an organic light-emitting diode (OLED) display, a quantum light-emitting diode (QLED) display, a mini-LED display, and/or the like), a keyboard circuitry, a mouse circuitry, and/or the like. For example, the input/output circuitry 220 may be configured to provide an application, browser, user interface, dashboard, webpage, and/or the like that are executed on and/or accessible via the client device 101A to cause display of information/data and for user interaction therewith via one or more user input interfaces. The input/output circuitry 220 may comprise any of a number of devices allowing the client device 101A to receive data, such as a keypad (hard or soft), a keyboard, a touch display, motion interfaces, scanners, readers, or other input device. In embodiments including a keypad, the keypad can include (or cause display of) the conventional numeric (0-9) and related keys (#, *), and other keys used for operating the client device 101A and may include a full set of alphabetic keys or set of keys that may be activated to provide a full set of alphanumeric keys.

For example, the user may provide user input data in the form of non-audio data to the client device via a keyboard and/or a mouse. The processing circuitry 206 may analyze the non-audio data, and determine that the non-audio data comprise the user's request to communicate, converse and/or interact with a conversational data-to-text system (for example, the conversational data-to-text system 150). Accordingly, the processing circuitry 206 may convert the non-audio data to user query data, and may transmit the user query data to a conversational data-to-text system (for example, the conversational data-to-text system 150).

Additionally, or alternatively, the client device 101A may comprise a sensor circuitry 222. Examples of the sensor circuitry 222 may include, but is not limited to, a touch sensor, an accelerometer, a gyroscope, a pressure sensor, a capacitive sensor, a proximity sensor, an ambient light sensor, and/or the like. As described above, the sensor circuitry 222 may be configured to detect one or more triggering events (for example, a user has pressed the physical button for a time duration longer than a predetermined time period) as indicating a user's request to communicate, converse and/or interact with a conversational data-to-text system (for example, the conversational data-to-text system 150). Subsequent to detecting the one or more triggering events, the processing circuitry 206 may convert audio data (generated by the microphone circuitry 202 and/or the ADC circuitry 204) and/or non-audio data (generated by the input/output circuitry 220) into user query data, and transmit the user query data to the communication interface circuitry 214.

In some embodiments, the communication interface circuitry 214 may communicate with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. For example, the communication interface circuitry 214 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The conversational data-to-text system 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

For example, the communication interface circuitry 214 may transmit user query data to a conversational data-to-text system (for example, the conversational data-to-text system 105), and may receive data, content, and/or information (such as output responses) from the conversational data-to-text system (for example, the conversational data-to-text system 105). Subsequently, the communication interface circuitry 214 may communicate such data, content, and/or information with the processing circuitry 206.

In embodiments where the client device 101A comprises the speaker circuitry 218 (and the DAC circuitry 216), the processing circuitry 206 may execute one or more algorithms and/or models that may convert and/or translate output responses into audio data (e.g., a text-to-speech algorithm that converts texts into audio). For example, the processing circuitry 206 may execute one or more speech synthesis modules stored in the storage circuitry 208 to convert the output response into audio data, and may transmit the audio data to the speaker circuitry 218 (or the DAC circuitry 216).

In some embodiments, the DAC circuitry 216 may convert audio data to acoustic signal(s) (for example, acoustic waveform(s)). In some embodiments, the DAC circuitry 216 may be electronically coupled to the speaker circuitry 218. In some embodiments, the speaker circuitry 218 may comprise an integrated DAC circuitry within the speaker circuitry 218, such that a separate DAC circuitry is not required.

In some embodiments, the speaker circuitry 218 may be configured to output acoustic signals (for example, acoustic waveforms). Examples of the speaker circuitry 218 may include, but not limited to, moving-iron speakers, piezoelectric speakers, electrostatic loudspeakers, and/or the like.

While the description above provides an example of presenting output responses generated by an example conversational data-to-text system through audio means, it is noted that the scope of the present disclosure is not limited to this example only. Additionally, or alternatively, output responses generated by an example conversational data-to-text system may be presented to a user through non-audio means.

For example, as described above, an example input/output circuitry 220 may comprise a display circuitry. In some embodiments, the processing circuitry 206 may cause the output responses rendered for display through the display circuitry.

As such, in various example embodiments of the present disclosure, a user may communicate, converse and/or interact with an example conversational data-to-text system via the client device 101A through audio means (for example, through the microphone circuitry 202 and/or the speaker circuitry 218) and/or non-audio means (for example, through the input/output circuitry 220). The client device 101A may generate and transmit user query data to a conversational data-to-text system, and the conversational data-to-text system may generate and transmit output responses to the client device 101A.

Example Conversational Data-to-Text System

FIG. 3 provides an illustrative schematic representative of an example conversational data-to-text system 105 that can be used in conjunction with embodiments of the present disclosure.

In the example shown in FIG. 3, the conversational data-to-text system 105 may include one or more components, such as, but is not limited to, one or more of a processing circuitry 301, a storage circuitry 303, and a communication interface circuitry 305. In some embodiments, the conversational data-to-text system 105 may optionally include an input/output circuitry 307.

In some embodiments, the processing circuitry 301 may be embodied in a number of different ways and may, for example, include one or more same or different processing devices configured to perform independently or jointly. In some embodiments, the processing circuitry 301 may be similar to the processing circuitry 206 described above in connection with FIG. 2.

In some embodiments, the communication interface circuitry 305 may communicate with various computing entities, such as by communicating data, content, information. In some embodiments, the communication interface circuitry 305 may be similar to the communication interface circuitry 214 described above in connection with FIG. 2.

In some embodiments, the input/output circuitry 307 may include a display circuitry, a keyboard circuitry, a mouse circuitry, and/or the like. In some embodiments, the input/output circuitry 307 may be similar to the input/output circuitry 220 described above in connection with FIG. 2.

In some embodiments, the storage circuitry 303 may be embodied in a number of different ways and may, for example, include one or more same or different data storage devices configured to perform independently or jointly, similar to those described above in connection with FIG. 2. In accordance with various embodiments of the present disclosure, one or more computer program products may be installed and/or stored in the storage circuitry 303.

In the example shown in FIG. 3, the storage circuitry 303 may store computer program products that include one or more of a semantic parser 325, a grammar database 324, a dimensional data model 309, a multi-dimensional database 314, a discourse model 327, and/or a response generator 329.

In some embodiments, subsequent to receiving user query data from a client device, the processing circuitry 301 may execute the semantic parser 325 to extract and interpret semantic information from the user query data. For example, the semantic parser 325 may convert user query data (for example, natural langue expressions) into sematic frames so that other modules and/or components (such as the dimensional data model 309) may query data based on the semantic frames.

In the present disclosure, the term "semantic frame" refers to a structural representation of sematic information associated with one or more expressions. For example, a semantic frame may represent temporal relationships described in one or more expressions.

As an example, an example user query data provided to the semantic parser 325 may comprise the following temporal expression:

"from 2017 to 2019"

Subsequent to receiving the user query data, the semantic parser 325 may extract the above temporal expression from the user query data, and may convert the temporal expression into the following semantic frame:

{time_interval: {start: {year: 2017}, end: {year: 2019}}}

Subsequently, the semantic parser 325 may provide the sematic frame to other modules and/or components (such as the dimensional data model 309), so that the conversational data-to-text system 105 may generate an output response based at least in part on the temporal expression in the user query data.

In some embodiments, the semantic parser 325 may comprise various algorithms. For example, the semantic parser 325 may comprise an extraction algorithm that identifies parts of the user query data (for example, an expression in natural language) that constitute one or more particular sematic feature (for example, time) and generates a parse tree. The parse tree may be an interim data frame that contains semantic information (e.g., points, intervals) as well as syntactic information (e.g., word order). In some embodiments, the semantic parser 325 may comprise an interpretation algorithm. The interpretation algorithm may receive the parse tree as an input, in conjunction with contextual information (e.g., the current time), and generates a semantic frame, which may be sent to and used by, for example, the dimensional data model 309.

In some embodiments, when executing the extraction algorithm and/or the interpretation algorithm of the semantic parser 325, the processing circuitry 301 may be configured to retrieve one or more grammar templates from the grammar database 324.

In the present disclosure, the term "grammar template" refers to a data object that defines a grammar structure of an expression (for example, a text string) associated with the expression. For example, grammar templates may define a grammar structure associated with an expression that indicates a time point, a grammar structure associated with an expression that indicates a time interval, and/or a grammar structure associated with an expression that indicates a variance period. In some embodiments, an example grammar template may additionally or alternative define a phrasal category (for example, noun phrases, pronouns, etc.) associated with each word or phase in an expression.

In some embodiments, a grammar template may be a "context-free grammar." The term context-free grammar refers to a set of recursive rules that may be implemented to generate one or more parse trees based on the grammar structure. In the present disclosure, the term "parse tree" refers to a data object in the form of an ordered tree structure comprising a root, nodes, and branches. For example, a node of the parse tree may represent a time point, a time interval, a variance period, etc. In some embodiments, an example parse tree may represent the syntactic structure of a text string according to a context-free grammar.

In some embodiments, the grammar database 324 may store a plurality of grammar templates. In some embodiments, one or more grammar templates may be created by a user (for example, an operator of conversational data-to-text system 105). In some embodiments, one or more grammar templates may be programmatically created (for example, by implementing one or more machine learning models). As such, the grammar database 324 is user expandable, user configurable, and/or scalable.

Referring back to FIG. 3, in some embodiments, the semantic parser 325 may provide semantic frames to the dimensional data model 309. In some embodiments, based on the semantic frames, the dimensional data model 309 may retrieve one or more multi-dimensional data objects from the multi-dimensional database 314.

In the present disclosure, the term "data object" refers to a data structure that represents one or more functionalities and/or characteristics associated with data and/or information. The term "multi-dimensional data object" refers to a data object that may model, represent, and/or view data in a multi-dimensional structure (for example, a three-dimensional data cube). The term "multi-dimensional dataset" refers to a collection of one or more multi-dimensional data objects.

In some embodiments, a multi-dimensional data object may be placed in a feature space. The feature space may have a corresponding measure, which represents the numerical data that the multi-dimensional data object represents (for example, sales data, profit data, etc.). The feature space may comprise one or more dimensions, and each dimension may correspond to categorical data.

The placement or location of a multi-dimensional data object in a feature space may be based on one or more dimension names (e.g., one or more categories such as product, country, segment, year, quarter, etc.) of the multi-dimensional data object and one or more dimension instances (e.g., an instance of each dimension such as U.S., U.K., France, Q1, etc.) of the multi-dimensional data object.

Referring now to FIG. 4, an example multi-dimensional data object 402 in an example feature space 400 is shown. In the example shown in FIG. 4, the feature space 400 may comprise three dimensions: X, Y, and Z. Each dimension may represent a category associated with the multi-dimensional data object 402. To determine the dimension instance for each dimension, the multi-dimensional data object 402 may be projected to one or more planes of the feature space 400.

For example, to determine the dimension instance A of the multi-dimensional data object 402 in the dimension X, the multi-dimensional data object 402 may be projected to the plane X-Z (shown as projection 408) or to the plane X-Y (shown as projection 404). To determine the dimension instance B of the multi-dimensional data object 402 in the dimension Y, the multi-dimensional data object 402 may be projected to the plane X-Y (shown as projection 404) or to the plane Y-Z (shown as projection 406). To determine the dimension instance C of the multi-dimensional data object 402 in the dimension Z, the multi-dimensional data object 402 may be projected to the plane X-Z (shown as projection 408) or to the plane Y-Z (shown as projection 406).

As an example, the feature space 400 may represent sales data. The X dimension may represent the country category, the Y dimension may indicate the time category, and the Z dimension may represent the product category. In this example, the multi-dimensional data object 402 may represent the sales data of a given product in a given country at a given time. For example, if A indicates France, B indicates July, and C indicates Nutrali, the multi-dimensional data object 402 may represent the sales data of Nutrali in France in July.

Referring back to FIG. 3, in some embodiments, the dimensional data model 306 may analyze the semantic frames generated by the semantic parser 325 to determine an expected structure of the multi-dimensional data object and analytic query to be performed on the multi-dimensional data object.

In the example shown in FIG. 3, the dimensional data model 306 comprises a query mapper 311 and an analytics operator 312. The query mapper 311 may determine the type of queries and parameters of these queries in the user query data (as represented by the semantic frames). In some embodiments, the analytics operator 312 may determine applicable data analytic operation (such as filtering, grouping, variance, etc.) to be performed on the multi-dimensional data object(s) to derive insight.

In some embodiments, the query mapper 311 may also determine the relevant narrative function for generating an output response. For example, when a query is mapped to an intent by the query mapper 311, the analytics operator 312 and the corresponding narrative function script are determined.

For example, the dimensional data model 309 may receive semantic frames representing the following user query data:

$1^{st}$ User Query: How are the sales of Nutrali in France for July?

In this example, the query mapper 311 may identify a filtering query in the user query data, and may identify the following parameters to the filtering query:
measure=sales
product=Nutrali
country=France
month July Based on these parameters, the query mapper 311 may filter a feature space and locate a multi-dimensional data object that corresponds to the sales of Nutrali in France for July. Additionally, the analytics operator 312 may perform data analytic operations on the multi-dimensional data object to yield insights.

In the example shown in FIG. 3, the discourse model 327 may assist the query mapper 311 in determining types of queries and parameters for these queries based on the contextual data (or contextual information). Given the conversational aspect of the conversational data-to-text system, in some examples, not all queries and parameters are explicitly supplied by the user query data. In such examples, the discourse model 327 may fill in the gaps left by the user query data, infer information such as, but not limited to, higher levels of granularity of temporal expressions, previously uttered entities (dimensions, instances, measures), whether by the user or the system, an/or the like.

For example, the conversational data-to-text system 105 may receive the following $1^{st}$ user query and generate the $1^{st}$ system response. The conversational data-to-text system 105 may then receive the following $2^{nd}$ user query:

$1^{st}$ User Query: How are Sales of Nutrali in France for July?

$1^{st}$ System Response: In July 2020, sales of Nutrali in France are USD 1.2 million.

$2^{nd}$ User Query: How about in Germany?

In the above example, the dimensional data model 309 may only be able to construct a very impoverished query object (where country=Germany). The discourse model 327 may fill in various parameters for the query based on the contextual information, so the entire query becomes:
measure=sales
product=Nutrali
country=Germany
month=July
year=2020

As such, the discourse model 327 may interpret and/or understand how sentences or utterances are related and ordered. For example, the discourse model 327 may generate contextual information that represent relationships between semantic frames used to model the user query data and/or relationships between entities that are present in the multi-dimensional data. Such contextual information may include information about each entity (e.g., relationships to other entities) and its properties in the discourse (e.g., the last point of mentioning in the conversation).

In some embodiments, the discourse model 327 may make corrections (for example, when the conversational data-to-text system 105 has misinterpreted the user's intent), use referring expressions (such as pronouns "they" or "that"), and/or infer underspecified information in the dialogue. By incorporating the discourse model 327, the conversational data-to-text system 105 may produce fluid and coherent answers without repeating information more than once in a multi-turn conversation dialogue, may use a strategy of implicit confirmation to alert users to new information in the answer, and/or may use referring expressions instead of full entity names.

Referring back to FIG. 3, the dimensional data model 309 may provide the multi-dimensional data object retrieved from the multi-dimensional database 314 to the response generator 329. The response generator 329 may be configured to generate a response output based on the retrieved multi-dimensional data object.

In some examples, the response generator 329 may select a matching narrative function script for the multi-dimensional data object from a script database. In the present disclosure, the term "narrative function script" refers to one or more algorithms for generating an output response in natural language based on a natural language query and/or one or more data objects (for example, one or more multi-dimensional data objects). For example, a narrative function script may define a template for generating a narrative based on an intent associated with natural language query (such as, but not limited to, filtering, grouping, variance, and/or the like). In such examples, the response generator 329 may generate the response output based on the selected multi-dimensional data object and the matching narrative function script, details of which are described herein.

In some embodiments, the response output generated by the response generator 329 may be provided to the discourse model 327, such that the discourse model 327 may update contextual information.

In some embodiments, the response output generated by the response generator 329 may be provided to the communication interface circuitry 305, which may transmit the response output to a client device (for example, one or more of client devices 101A, 101B, . . . as described above). Subsequently, the client device may present the response output to a user through, for example, audio and/or non-audio means as described above.

While the description above provides examples of generating a natural language response regarding sales data, it is noted that scope of the present disclosure is not limited to this example only. In some embodiments, various examples of the present disclosure may provide one or more natural language response in other topic(s), such that various embodiments of the present disclosure are not topic specific.

Example Methods

Various methods described herein, including, for example, example methods as shown in FIG. 5A, FIG. 5B, FIG. 6A, FIG. 6B, FIG. 6C, and FIG. 6D, may parse a temporal expression in a conversational data-to-text system. For example, the example methods as shown in FIG. 5A, FIG. 5B, FIG. 6A, FIG. 6B, FIG. 6C, and FIG. 6D may be executed by the processing circuitry 301 of the conversational data-to-text system 105 discussed above in connection with FIG. 3.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 5A, FIG. 5B, FIG. 6A, FIG. 6B, FIG. 6C, and FIG. 6D may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s). For example, one or more of the procedures described in FIG. 5A, FIG. 5B, FIG. 6A, FIG. 6B, FIG. 6C, and FIG. 6D may be embodied by the semantic parser 325 described above in connection with FIG. 3.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As described above, various example embodiments of the present disclosure are related to providing temporal expression parser that may translate input text strings that indicate temporal expressions in natural language into semantic frames so that a computing system (such as a conversational data-to-text system) may use the semantic frames to query data (such as multi-dimensional data objects). For example, the following is an example input text string:

from 2017 to 2019.

An example temporal expression parser in accordance with example embodiments of the present disclosure may convert the above example input text string into the following semantic frame:

{time_interval: {start: {year: 2017}, end: {year: 2019}}}

Based on the above example semantic frame, a computing system (such as a conversational data-to-text system) may query data from the following database:

| ROW | YEAR | DATA |
|-----|------|------|
| 1 | 2016 | . . . |
| 2 | 2017 | . . . |
| 3 | 2018 | . . . |
| 4 | 2019 | . . . |
| 5 | 2020 | . . . |

In this example, the computing system may obtain data associated with rows 2, 3, and 4, while ignoring data associated with rows 1 and 5.

FIG. 5A, FIG. 5B, FIG. 6A, FIG. 6B, FIG. 6C, and FIG. 6D illustrate example methods and operations associated with example temporal expression parsers in accordance with example embodiments of the present disclosure.

Referring now to FIG. 5A and FIG. 5B, an example method 500 is illustrated. In particular, FIG. 5A and FIG. 5B may describe an example extraction algorithm. As described above, an example extraction algorithm may, for example but not limited to, identify parts of an input sentence that constitute temporal expressions and return a parse tree, which is an interim data frame that contains semantic information (e.g., points vs intervals) as well as syntactic information (e.g., word order).

Referring now to FIG. 5A, the example method 500 starts at block 501 and then proceed to step/operation 503. At step/operation 503, a processing circuitry (such as the processing circuitry 301 of the conversational data-to-text system 105 described above in connection with FIG. 1 and FIG. 2) may receive user query data.

In some embodiments, the user query data may comprise an input text string. In some embodiments, the input text string may comprise one or more of character(s), word(s), number(s), sentence(s), phrase(s), and/or the like. For example, the EXAMPLE 1 below illustrates an example of input text string:

EXAMPLE 1: $2^{nd}$ Mar

As another example, the EXAMPLE 2 below illustrates another example of input string:

EXAMPLE 2: from Mar 2018 to last month

As another example, the EXAMPLE 3 below illustrates another example of input string:

EXAMPLE 3: month on month

Referring back to FIG. 5A, subsequent to step/operation 503, the method 500 may proceed to step/operation 505. At step/operation 505, a processing circuitry (such as the processing circuitry 301 of the conversational data-to-text system 105 described above in connection with FIG. 1 and FIG. 2) may retrieve a grammar template.

In some embodiments, the processing circuitry may retrieve the grammar template from a grammar database (for example, the grammar database 324 described above in connection with FIG. 3). In some embodiments, the grammar template may correspond to the input text string of the user query data received at step/operation 503. For example, the grammar template may define a grammar structure associated with the input text string (for example, an expected structure of the input text string and one or more terminals (e.g., words) to be detected in the input text string). In some embodiments, the grammar template retrieved from the grammar database may be a context-free grammar, as defined above.

Referring back to FIG. 5A, subsequent to step/operation 505, the method 500 may proceed to step/operation 507. At step/operation 507, a processing circuitry (such as the processing circuitry 301 of the conversational data-to-text system 105 described above in connection with FIG. 1 and FIG. 2) may generate a n-gram set.

In some embodiments, the processing circuitry may generate the n-gram set based at least in part on the input text string of the user query data received at step/operation 503. In some embodiments, the n-gram set may comprise a plurality of n-gram elements.

In the present disclosure, the term "n-gram element" refers to a data object that represents a sequence of n consecutive words. The "order" of the n-gram element corresponds to the number of words in the n-gram element. For example, an unigram (or 1-gram) element comprises one word, a bi-gram (or 2-gram) element comprises two words, etc.

In some embodiments, the processing circuitry may generate the plurality of n-gram elements based on breaking down the input text string into words, and combining a number of contiguous words according to the order of the n-gram elements. For example, the processing circuitry may first generate a plurality of 1-gram elements (e.g., separating each individual word in the input text string), and then a plurality of 2-gram elements (e.g., combining two neighboring words in the input text string), . . . until the maximum order of n-gram element is reached based on the number of words in the input text string (for example, a 5-word input text string has a maximum order of 5-gram element).

Continuing from the EXAMPLE 1 above, the processing circuitry may generate the following 1-grams and a 2-gram:

EXAMPLE 1: [2nd, Mar, 2nd Mar]

Continuing from the EXAMPLE 2 above, the processing circuitry may generate the following 1-grams, 2-grams 3-grams, 4-grams, 5-grams, and a 6-gram:

EXAMPLE 2: [from, Mar, 2018, to, last, month, from Mar, Mar 2018, 2018 to, to last, last month, from Mar 2018, Mar 2018 to, 2018 to last, to last month, from Mar 2018 to, Mar 2018 to last, 2018 to last month, from Mar 2018 to last, Mar 2018 to last month, from Mar 2018 to last month]

Continuing from the EXAMPLE 3 above, the processing circuitry may generate the following 1-grams, 2-grams, and a 3-gram:

EXAMPLE 3: [month, on, month, month on, on month, month on month]

In some embodiments, an arrangement of the plurality of n-gram elements in the n-gram set may be determined based on a location of each n-gram element with respective to the input text string and a size of each n-gram element. For example, a n-gram element having a larger size (e.g., a higher order) is arranged later in the n-gram set compared to a n-gram element having a smaller size (e.g., a lower order). As an example, a 2-gram element is arranged later in the n-gram set than a 1-gram element. Additionally, or alternatively, a n-gram element that has a location with closer to the beginning of the input text string is arranged before a n-gram element that has a location away from the beginning of the input text string, given that both n-gram elements have the same order. For example, in a n-gram set for the input text string "December 19," the 1-gram element "December" is arranged before the 1-gram element "19." Additional examples of arrangements are illustrated above in connection with EXAMPLE 1, EXAMPLE 2, and EXAMPLE 3.

Referring back to FIG. 5A, subsequent to step/operation 507, the method 500 may proceed to step/operation 509. At step/operation 509, a processing circuitry (such as the processing circuitry 301 of the conversational data-to-text system 105 described above in connection with FIG. 1 and FIG. 2) may traverse each n-gram element.

In some embodiments, the processing circuitry may traverse each n-gram element in the n-gram set to generate a parse tree list. For example, by traversing each n-gram element in the n-gram set, the processing circuitry may find a parse tree for each n-gram element (if available) based on the grammar template associated with the input text string (for example, the grammar template retrieved at step/operation 505), details of which are described in connection with at least step/operation 515. If a parse tree is available, the processing circuitry adds the parse tree to the parse tree list, details of which are described in connection with at least step/operation 517.

In some embodiments, the parse tree list comprises one or more parse trees. In some embodiments, the parse tree list may be empty (e.g., there is no parse tree available based on the n-gram elements in the n-gram set).

In some embodiments, the processing circuitry may traverse each n-gram element in the n-gram set according to the arrangement of the plurality of n-gram elements as described above. For example, the processing circuitry may traverse the first n-gram element in the n-gram set, then traverse the second n-gram element in the n-gram set, . . . until all the n-grams in the n-gram set are traversed.

Referring back to FIG. 5A, subsequent to step/operation 509, the method 500 may proceed to block A that connects FIG. 5A with FIG. 5B. Referring now to FIG. 5B, subsequent to block A, the method 500 may proceed to step/operation 511. At step/operation 511, a processing circuitry (such as the processing circuitry 301 of the conversational data-to-text system 105 described above in connection with FIG. 1 and FIG. 2) may determine whether all the n-grams in the n-gram set have been traversed.

If, at step/operation 511, the processing circuitry determines that not all the n-grams in the n-gram set have been traversed, the method 500 may proceed to step/operation 513. At step/operation 513, a processing circuitry (such as the processing circuitry 301 of the conversational data-to-text system 105 described above in connection with FIG. 1 and FIG. 2) may traverse the next n-gram element in the n-gram set (for example, retrieving the next n-gram element and determining whether a parse tree is available, as described further herein).

Subsequent to step/operation 513, the method 500 may proceed to step/operation 515. At step/operation 515, a processing circuitry (such as the processing circuitry 301 of the conversational data-to-text system 105 described above in connection with FIG. 1 and FIG. 2) may determine whether the grammar template defines a parse tree for the n-gram element traversed at step/operation 513. In other words, through steps/operations 511, 513, and 515, the processing circuitry may determine, for a n-gram element in the n-gram set, whether the grammar template defines a corresponding parse tree for the n-gram element.

As defined above, the grammar template may define a grammar structure associated with an expression, which may be implemented to generate a parse tree corresponding to an n-gram. For example, for a 1-gram "Mar," the grammar template may define a parse tree [{point: {month=Mar}}]. In this example, the parse tree comprises one node that represent a time point.

In some embodiments, the grammar template may not define a parse tree for a n-gram, or define an empty parse tree for a n-gram. For example, for a 1-gram "from," the grammar template may not define a parse tree, or may define an empty parse tree [ ]. In some embodiments, the grammar template may not define a parse tree for a n-gram if the n-gram does not provide temporal information.

If, at step/operation 515, the processing circuitry determines that the grammar template defines a parse tree for the n-gram element traversed at step/operation 513, the method 500 may proceed to step/operation 517. At step/operation 517, a processing circuitry (such as the processing circuitry 301 of the conversational data-to-text system 105 described above in connection with FIG. 1 and FIG. 2) may add the parse tree to a parse tree list.

In other words, the processing circuitry may add the parse tree to the parse tree list (and therefore expanding the parse tree list) based on determining that the grammar template defines a corresponding parse tree for the n-gram element. Continuing from the EXAMPLE 1 above, the processing circuitry may generate the following parse tree T for each n-gram element n in the n-gram set based on the grammar template:

EXAMPLE 1: For n=2nd, T=[{point: {day=2nd}}]
    For n=Mar, T=[{point: {month=Mar}}]
    For n=2nd Mar, T=[{point: {day=2nd}}, {point: {month=Mar}}]

Continuing from the EXAMPLE 2 above, the processing circuitry may generate the following parse tree T for each n-gram element n in the n-gram set based on the grammar template:

EXAMPLE 2: For n=from, T=[ ]
    For n=Mar, T=[{point: {month=Mar}}]
. . .
    For n from Mar 2018 to last month, T={interval: edge{prep: from, point{month: Mar, year: 2018}}, edge{prep: to, point{deixis: last, expression: month}}}]

Continuing from the EXAMPLE 3 above, the processing circuitry may generate the following parse tree T for each n-gram element n in the n-gram set based on the grammar template:

EXAMPLE 3: For n=month, T=[ ]
    For n-on, T=[ ]
. . .
For n=month on month, T=[{variance_period: {granularity: month, prep: on, granularity: month}}]

Referring back to FIG. 5B, subsequent to step/operation 517, the method 500 may proceed back to step/operation 511.

Referring back to step/operation 515, if the processing circuitry determines that the grammar template does not define a parse tree for the n-gram element traversed at step/operation 513, the method 500 may proceed back to step/operation 511. Alternatively, the processing circuitry may generate an empty parse tree as described above.

Referring back to step/operation 511, if the processing circuitry determines that all the n-grams in the n-gram set have been traversed, the method 500 may proceed to step/operation 519. At step/operation 519, a processing circuitry (such as the processing circuitry 301 of the conversational data-to-text system 105 described above in connection with FIG. 1 and FIG. 2) may generate semantic frame(s).

In some embodiments, the semantic frame(s) may indicate a temporal expression associated with the input text string. For example, the semantic frame(s) may indicate a time point, a time interval, and/or a variance period, details of which are described herein, including, but not limited to, those described in connection with FIG. 6A, FIG. 6B, FIG. 6C, and FIG. 6D.

In some embodiments, the processing circuitry may generate semantic frame(s) based at least in part on a last parse tree of the parse tree list. In some embodiments, the last parse tree of the parse tree list is defined by the grammar template for a largest n-gram element within the n-gram set. For example, the n-gram set may include n-grams having a highest order of 5, and the processing circuitry may determine that the grammar template defines a parse tree for the 5-gram element in the n-gram set. In this example, the parse tree for the 5-gram element is the last parse tree in the parse tree list. As another example, the n-gram set may include n-grams having a highest order of 5, and the processing circuitry may determine that the grammar template does not define a parse tree for the 5-gram element in the n-gram set, and the highest order of n-gram defined by the grammar template is a 4-gram element. In this example, the parse tree for the 4-gram element is the last parse tree in the parse tree list.

Continuing from the EXAMPLE 1 above, the processing circuitry may determine the following last parse tree/for generating the semantic frames:
EXAMPLE 1: t={point: {day=2nd, month=Mar}}
Continuing from the EXAMPLE 2 above, the processing circuitry may determine the following last parse tree/for generating the semantic frames:
EXAMPLE 2: t={interval: edge{prep: from, point{month: Mar, year: 2018}}, edge{prep: to, point{deixis: last, expression: month}}}
Continuing from the EXAMPLE 3 above, the processing circuitry may determine the following last parse tree/for generating the semantic frames:
EXAMPLE 3: t=[{variance_period: {granularity: month, prep: on, granularity: month}}

Referring now in FIG. 5B, subsequent to step/operation 519, the example method 500 ends at block 521.

Referring now to FIG. 6A, FIG. 6B, FIG. 6C, and FIG. 6D, an example method 600 and its variations are illustrated. In particular, FIG. 6A, FIG. 6B, FIG. 6C, and FIG. 6D may describe example interpretation algorithms. As described above, an example interpretation algorithm may, for example but not limited to, consume the parse tree (generated by an example extraction algorithm) in conjunction with contextual information (e.g., the current time) and returns a purely semantic frame, which is ready to be used by a data querying mechanism (for example, a conversational data-to-text system).

Figure 6A:
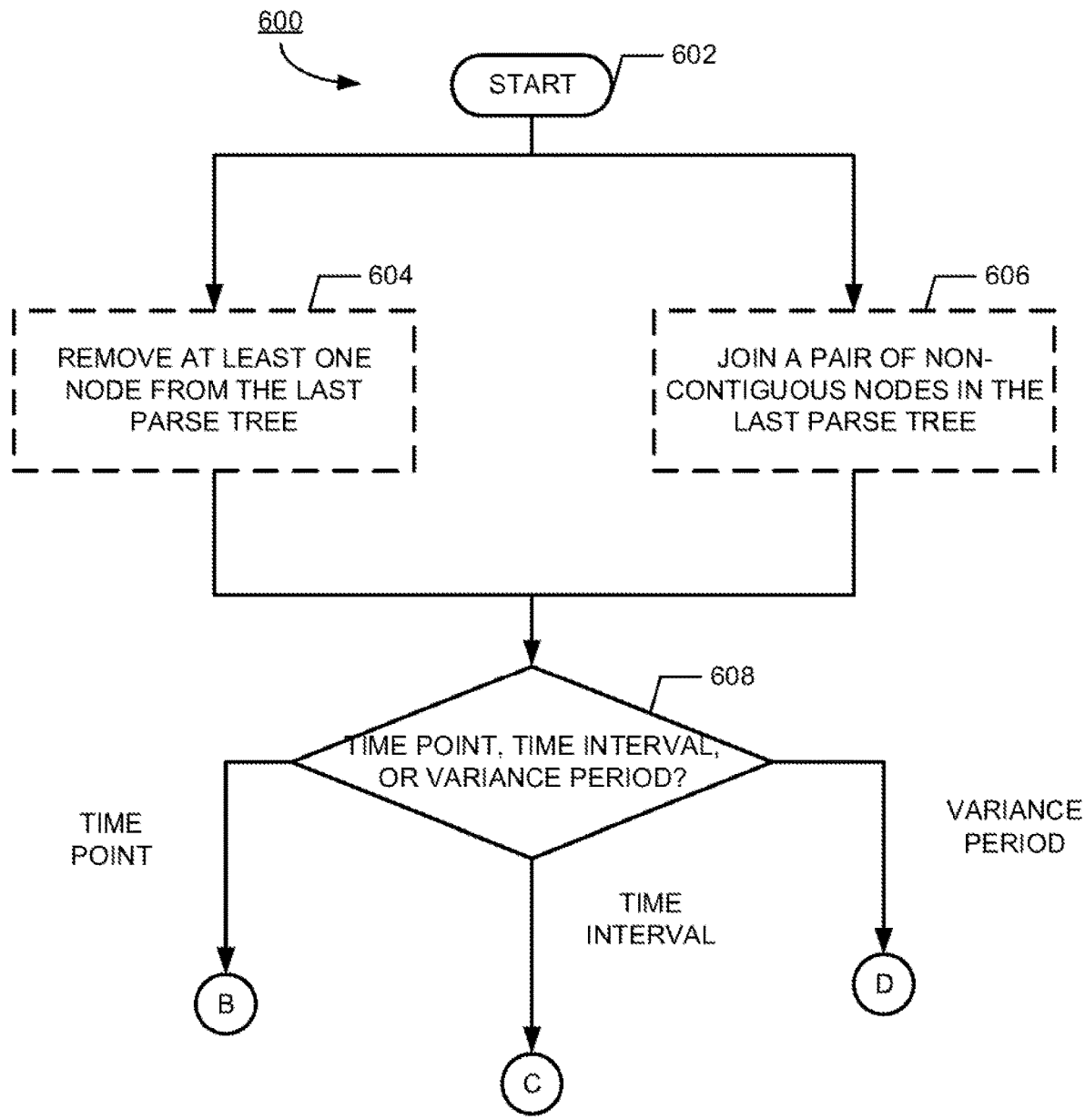

Referring now to FIG. 6A, the example method 600 starts at block 602 and then proceeds to step/operation 604. At step/operation 604, a processing circuitry (such as the processing circuitry 301 of the conversational data-to-text system 105 described above in connection with FIG. 1 and FIG. 2) may remove at least one node from the last parse tree.

In some embodiments, the last parse tree may be generated based on the example method 500 described above in connection with FIG. 5A and FIG. 5B. In some embodiments, the at least one node removed from the last parse tree may represent at least one stop word.

For example, the last parse tree may comprise a plurality of nodes that are generated based on the grammar template as defined above. These nodes may represent stop words in the input text string. The term "stop word" refers to a word that needs to be filtered out before the parse tree is processed, which may be defined by the system (for example, the conversational data-to-text system). Example stop words may include, but is not limited to, "the," "an," "is," and/or the like.

While the description above provides an example type of node to be removed from the parse tree, it is noted that the scope of the present disclosure is not limited to the description above. In some examples, an example method may remove one or more additional or alternative types of nodes from the parse tree as needed by the system.

At step/operation 606, a processing circuitry (such as the processing circuitry 301 of the conversational data-to-text system 105 described above in connection with FIG. 1 and FIG. 2) may join a pair of non-contiguous nodes in the last parse tree.

In some embodiments, the processing circuitry may join non-contiguous nodes that represent temporal words. For example, the processing circuitry may determine that a first node and a second node in the parse tree both represent temporal words, and may determine that the first node and the second node are separated by one or more nodes in the parse tree that do not represent temporal words (and therefore the first node and the second node are non-contiguous). The processing circuitry may remove the one or more nodes so that the first node and the second node are joined.

As an example, the last parse tree may correspond to the input text string "From 9:00 to no later than 11:00." The processing circuitry may determine that the first node representing "9:00" and the second node representing "11:00" (both representing temporal words) are separated by the node representing "no later than." The processing circuitry may remove the node representing "no later than" so that the first node and the second node are joined.

As shown in the above example, example embodiments of the present disclosure may parse temporal expressions that are not contiguous.

While the description above provides an example type of node joined by the processing circuitry, it is noted that the scope of the present disclosure is not limited to the description above. In some examples, an example method may comprise one or more additional and/or alternative types of nodes joined by the processing circuitry.

In some embodiments, the method 600 may perform step/operation 604 prior to step/operation 606. In some embodiments, the method 600 may perform step/operation 604 subsequent to step/operation 606. In some embodiments, the method 600 may perform step/operation 604 in parallel or at the same time with step/operation 606. In some embodiments, the method 600 may skip step/operation 604 and/or step/operation 606.

Subsequent to step/operation 604, step/operation 606, and/or block 602, the method 600 may proceed to step/operation 608. At step/operation 608, a processing circuitry (such as the processing circuitry 301 of the conversational data-to-text system 105 described above in connection with FIG. 1 and FIG. 2) may determine whether the last parse tree corresponds to a time point, a time interval, or a variance period.

In some embodiments, the processing circuitry may make such a determination based at least in part on the grammar template as defined above. In some embodiments, if the processing circuitry determines that the parse tree corresponds to a time point, the method 600 may proceed to block B, which connects FIG. 6A with FIG. 6B. In some embodiments, if the processing circuitry determine that the parse tree corresponds to a time interval, the method 600 may proceed to block C that connects FIG. 6A with FIG. 6C. In some embodiments, if the processing circuitry determine that the parse tree corresponds to a variance period, method 600 may proceed to block D that connects FIG. 6A with FIG. 6D.

Figure 6B:
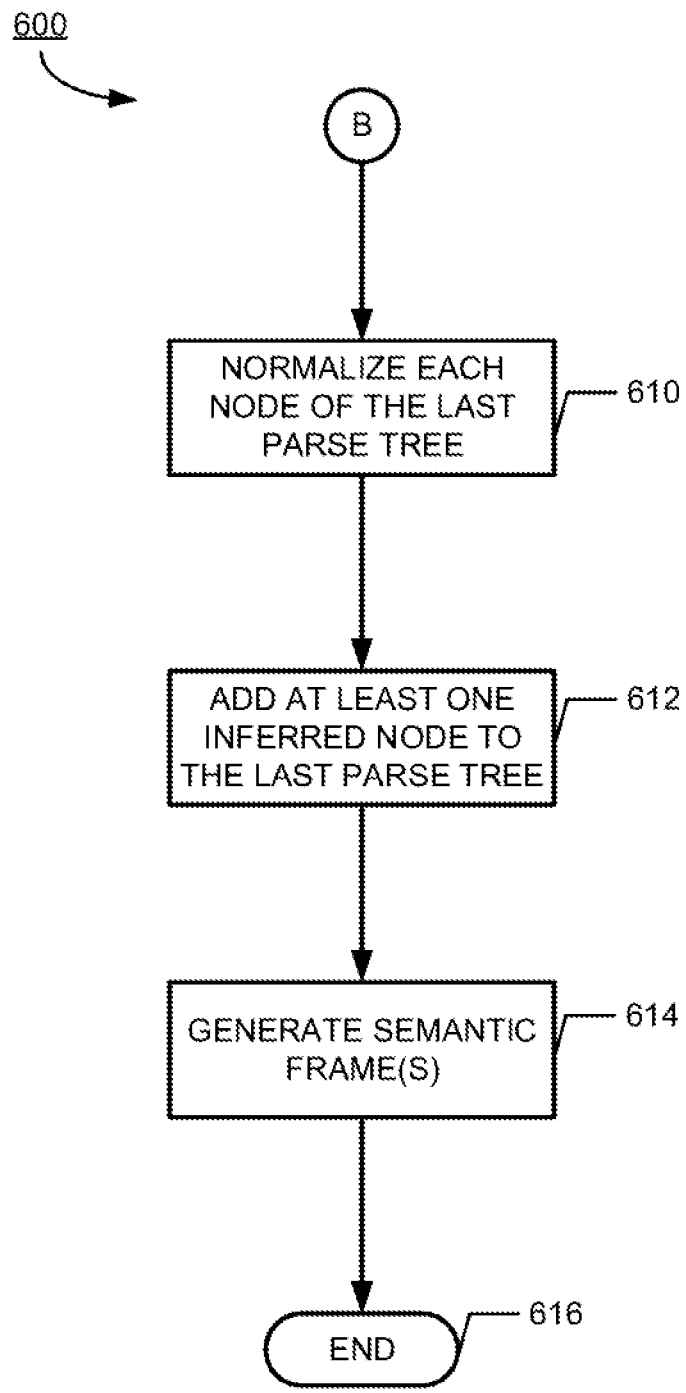

Referring now to FIG. 6B, subsequent to block B (where the processing circuitry determines that the last parse tree corresponds to a time point), the method 600 may proceed to step/operation 610. At step/operation 610, a processing circuitry (such as the processing circuitry 301 of the conversational data-to-text system 105 described above in connection with FIG. 1 and FIG. 2) may normalize each node of the last parse tree.

For example, the processing circuitry may normalize each node based on a standard structure for the type of node (e.g., time point, time interval, variance period) as defined by the grammar template. Continuing from the EXAMPLE 1 above, the processing circuitry may normalize each node in the following last parse tree/to generate a normalized parse tree t':
EXAMPLE 1: t={point: {day=2nd, month=Mar}}
t'={time_point: {day=2, month=3}}
as shown in the above example, the processing circuitry may convert alphabetical values into numerical values as part of normalizing each node. It is noted that the scope of the present disclosure is not limited to the example above.

Subsequent to step/operation 610, the method 600 may proceed to step/operation 612. At step/operation 612, a processing circuitry (such as the processing circuitry 301 of the conversational data-to-text system 105 described above in connection with FIG. 1 and FIG. 2) may add at least one inferred node to the last parse tree.

In some embodiments, the processing circuitry may add at least one inferred node to the last parse tree based at least in part on a current time descriptor and a temporal granularity descriptor associated with the input text string. The term "current time descriptor" refers to a data object that represents a current time as determined by the computer system (for example, a conversational data-to-text system). The term "temporal granularity descriptor" refers to a data object that defines a level of temporal granularity. For example, the temporal granularity descriptor may define a [day, month] structure, a [month, year] structure, a [day, month, year] structure, and/or the like. In some embodiments, the temporal granularity descriptor may be determined based on a system requirement.

As an example, the processing circuitry may determine that the last parse tree contains only a node {time_point: {month=3}. The processing circuitry may determine that the temporal granularity descriptor requires a [month, year] structure. To infer a node for the year, the processing circuitry may determine that the current time descriptor indicates a current year of 2020. As such, the processing circuitry may add an inferred node to the parse tree that indicates the year 2020. It is noted that the scope of the present disclosure is not limited to the example above.

Subsequent to step/operation 612, the method 600 may proceed to step/operation 614. At step/operation 614, a processing circuitry (such as the processing circuitry 301 of the conversational data-to-text system 105 described above in connection with FIG. 1 and FIG. 2) may generate semantic frame(s) based on the last parse tree (whose nodes have been normalized and/or added with inferred nodes, as applicable). Continuing from the EXAMPLE 1 above, the processing circuitry may generate the following semantic frame f for the input text string s:

EXAMPLE 1: s=2nd Mar
f={time_point: {day=2, month=3, year=2020}}

In the example shown in FIG. 6B, subsequent to step/operation 614, the method 600 ends at block 616.

Figure 6C:
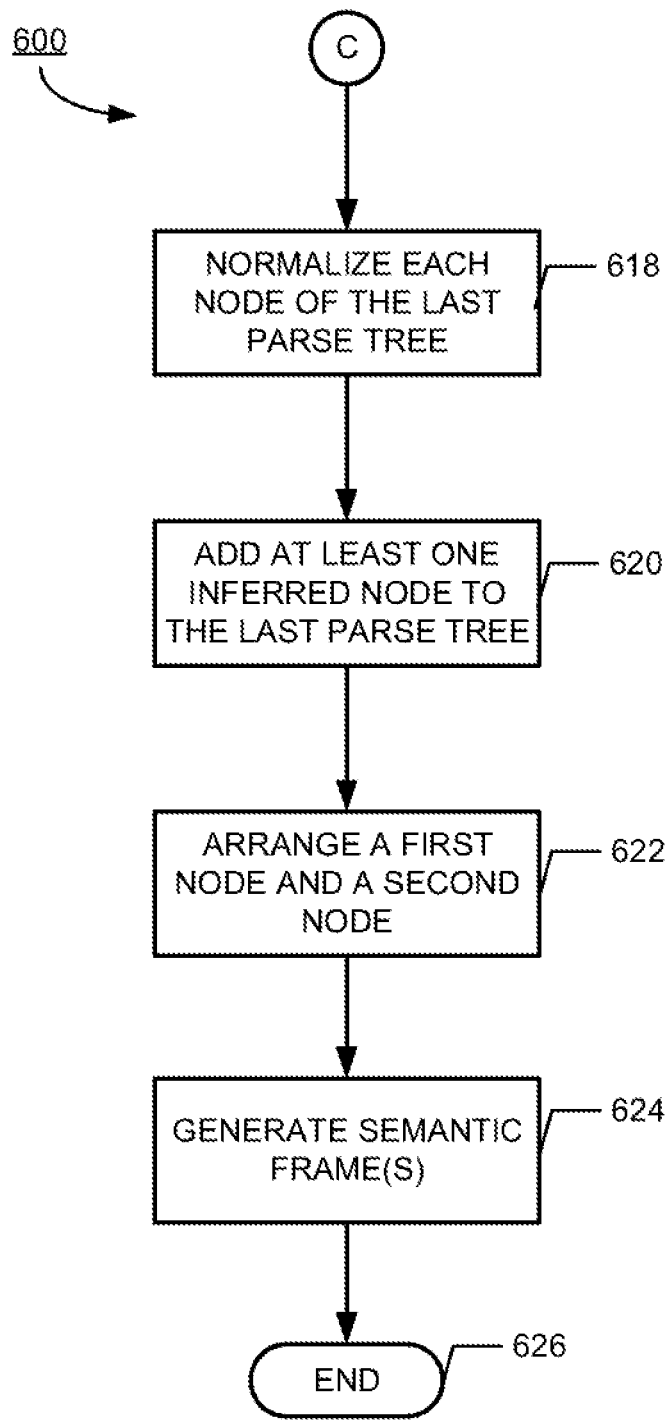

Referring now to FIG. 6C, subsequent to block C (where the processing circuitry determines that the last parse tree corresponds to a time interval), the method 600 may proceed to step/operation 618. At step/operation 618, a processing circuitry (such as the processing circuitry 301 of the conversational data-to-text system 105 described above in connection with FIG. 1 and FIG. 2) may normalize each node of the last parse tree, similar to those described above in connection with step/operation 610 of FIG. 6B.

Subsequent to step/operation 618, the method 600 may proceed to step/operation 620. At step/operation 620, a processing circuitry (such as the processing circuitry 301 of the conversational data-to-text system 105 described above in connection with FIG. 1 and FIG. 2) may add at least one inferred node to the last parse tree, similar to those described above in connection with step/operation 612 of FIG. 6B.

Subsequent to step/operation 620, the method 600 may proceed to step/operation 622. At step/operation 622, a processing circuitry (such as the processing circuitry 301 of the conversational data-to-text system 105 described above in connection with FIG. 1 and FIG. 2) may arrange a first node of the last parse tree and a second node of the last parse tree.

As described above, FIG. 6C corresponds to when the processing circuitry determines that the last parse tree indicates a time interval, which may comprise two time points. As such, a first node of the last parse tree may represent a first time point and a second node of the last parse tree may represent a second time point. The processing circuitry may determine which time point is the beginning time point and which time point is the ending time point, and arrange the nodes so that the node representing the beginning time point is placed before the node representing the ending time point.

For example, the processing circuitry may compare values of these two time points and determine which one has a lower time value (for example, a lower numeric value for year, month, and/or date). The processing circuitry may determine that the time point with a lower time value corresponds to the beginning time point of the time interval, and the time point with a higher time value corresponds to the ending time point of the time interval.

Continuing from the EXAMPLE 1 above, the processing circuitry may arrange nodes ns in a last parse tree generated for the input text string s:

EXAMPLE 1: s=from March 2018 to last month
ns=time_interval: {start: {month=3, year=2018}}, end: {month=7, year=2020}}

Subsequent to step/operation 622, the method 600 may proceed to step/operation 624. At step/operation 624, a processing circuitry (such as the processing circuitry 301 of the conversational data-to-text system 105 described above in connection with FIG. 1 and FIG. 2) may generate semantic frame(s) based on the last parse tree, similar to those described above in connection with step/operation 614.

In the example shown in FIG. 6C, subsequent to step/operation 624, the method 600 ends at block 626.

Figure 6D:
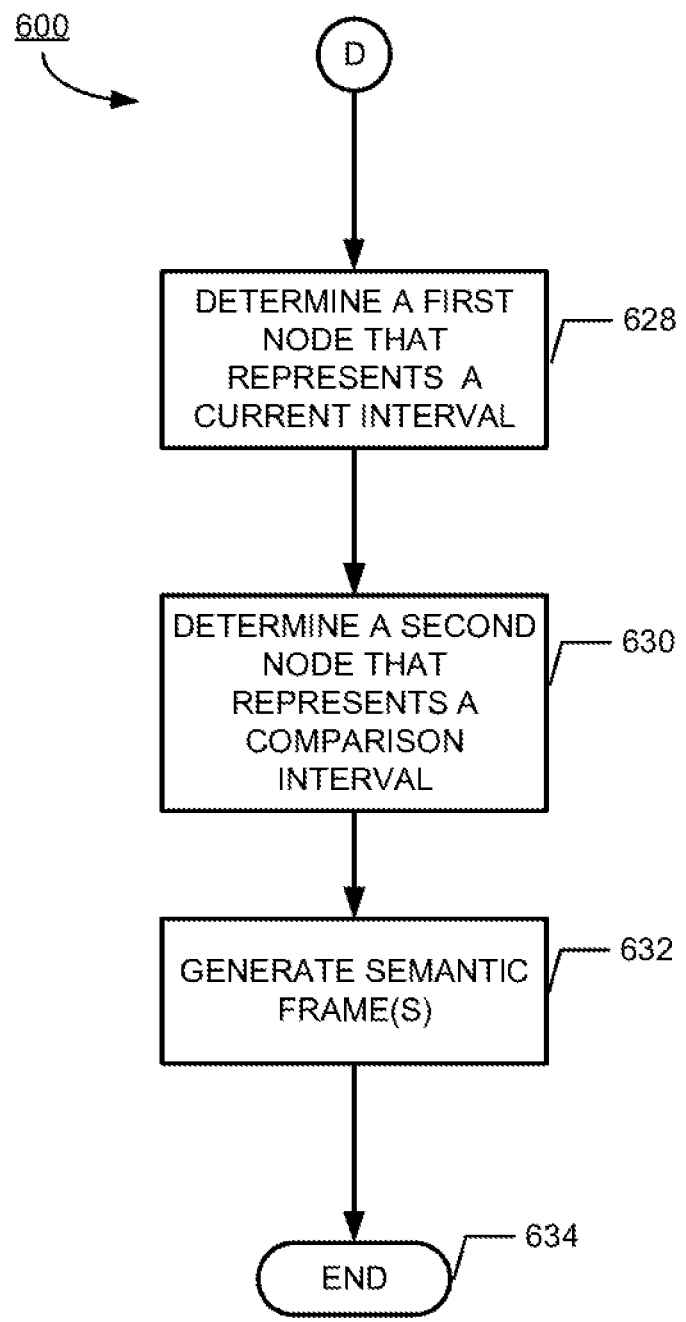

Referring now to FIG. 6D, subsequent to block D (where the processing circuitry determines that the last parse tree corresponds to a variance period), the method 600 may proceed to step/operation 628. At step/operation 628, a processing circuitry (such as the processing circuitry 301 of the conversational data-to-text system 105 described above in connection with FIG. 1 and FIG. 2) may determine a first node that represents a current interval associated with the variance period.

In some embodiments, the processing circuitry determine a first node of last parse tree that represents a current interval based at least in part on a current time descriptor. In some embodiments, the current interval may be an oldest to-date interval (e.g., a time interval that does not cover a future date compared to the current time). Continuing form the EXAMPLE 3 described above, the processing circuitry may determine the following last parse tree:

EXAMPLE 3: t=[{variance_period: {granularity: month, prep: on, granularity: month}}

As shown in the above example, the last parse tree may define a granularity level indicating month for determining the interval for the variance period. The processing circuitry may determine that the current time descriptor indicates a current time of [2020-08-21] (e.g., July 21, 2020). The processing circuitry may determine the current interval based on setting the beginning time of the current interval based on the granularity level (e.g., the beginning of the month), and the ending time of the current interval as the day before the current day. Continuing from EXAMPLE 3, the processing circuitry may determine the following node that represents a current interval:

EXAMPLE 3: current interval={start: {day: 1, month: 8, year: 2020}, end: {day: 20, month: 8, year: 2020}}

Subsequent to step/operation 628, the method 600 may proceed to step/operation 630. At step/operation 630, a processing circuitry (such as the processing circuitry 301 of the conversational data-to-text system 105 described above in connection with FIG. 1 and FIG. 2) may determine a second node that represents a comparison interval.

In some embodiments, the processing circuitry may determine the comparison interval based at least in part on the current interval. In some embodiments, the comparison interval represents a same interval length as the current interval. Continuing from EXAMPLE 3 above, the processing circuitry may determine the following comparison interval based on the current interval and the granularity level indicating month:

EXAMPLE 3: comparison interval={start: {day: 1, month: 7, year: 2020}, end: {day: 20, month: 7, year: 2020}}

Subsequent to step/operation 630, the method 600 may proceed to step/operation 632. At step/operation 632, a processing circuitry (such as the processing circuitry 301 of the conversational data-to-text system 105 described above in connection with FIG. 1 and FIG. 2) may generate semantic frame(s), similar to those described above in connection with step/operation 614 of FIG. 6B.

In the example shown in FIG. 6D, subsequent to step/operation 632 the method 600 ends at block 634.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:
   receive user query data comprising an input text string;
   generate, based at least in part on the input text string, a n-gram set comprising a plurality of n-gram elements, wherein an arrangement of the plurality of n-gram elements in the n-gram set is determined based at least in part on a location of each n-gram element with respective to the input text string and a size of each n-gram element;
   traverse each n-gram element in the n-gram set to generate a parse tree list comprising one or more parse trees based at least in part on a grammar template associated with the input text string;
   generate, based at least in part on one or more of a node of a last parse tree of the parse tree list representing at least one stop word or joining a pair of non-contiguous nodes that represent temporal words in the last parse tree, one or more semantic frames indicating a temporal expression associated with the input text string, wherein the last parse tree comprises a plurality of nodes generated based at least in part on the grammar template;
   provide, to a dimensional data model, the one or more semantic frames;
   retrieve, by the dimensional data model, from a multi-dimensional database and based at least in part on the one or more semantic frames, one or more multi-dimensional data objects, wherein each multi-dimensional data object of the one or more multi-dimensional data objects is placed in a feature space, wherein the feature space comprises one or more dimensions corresponding to categorial data and measures representing numerical data represented by the multi-dimensional data object; and
   generate, based at least in part on executing an analytic query on the one or more multi-dimensional data objects, an output response, wherein the analytic query is determined based at least in part on the temporal expression associated with the input text string.

2. The apparatus of claim 1, wherein, prior to traversing each n-gram element in the n-gram set, the at least one non-transitory memory and the program code are configured to, with the at least one processor, cause the apparatus to further:

retrieve, from a grammar database, the grammar template corresponding to the input text string, wherein the grammar template defines a grammar structure associated with the input text string.

3. The apparatus of claim 1, wherein the grammar template is a context-free grammar.

4. The apparatus of claim 1, wherein the at least one non-transitory memory and the program code are configured to, with the at least one processor, cause the apparatus to traverse each n-gram element in the n-gram set according to the arrangement of the plurality of n-gram elements.

5. The apparatus of claim 1, wherein the at least one non-transitory memory and the program code are configured to, with the at least one processor, cause the apparatus to further:
when traversing each n-gram in the n-gram set to generate the parse tree list,
determine, for a n-gram element in the n-gram set, whether the grammar template defines a corresponding parse tree for the n-gram element; and
based at least in part on determining that the grammar template defines the corresponding parse tree for the n-gram element, add the corresponding parse tree to the parse tree list.

6. The apparatus of claim 5, wherein the last parse tree of the parse tree list is defined by the grammar template for a largest n-gram element within the n-gram set.

7. The apparatus of claim 1, wherein, when generating the one or more semantic frames, the at least one non-transitory memory and the program code are configured to, with the at least one processor, cause the apparatus to further:
determine, based at least in part on the grammar template, whether the last parse tree corresponds to a time point, a time interval, or a variance period.

8. The apparatus of claim 7, wherein the at least one non-transitory memory and the program code are configured to, with the at least one processor, cause the apparatus to further:
in response to determining that the last parse tree corresponds to the time point:
normalize each node of the last parse tree; and
add at least one inferred node to the last parse tree based at least in part on a current time descriptor and a temporal granularity descriptor associated with the input text string.

9. The apparatus of claim 7, wherein the at least one non-transitory memory and the program code are configured to, with the at least one processor, cause the apparatus to further:
in response to determining that the last parse tree corresponds to the time interval:
normalize each node of the last parse tree;
add at least one inferred node to the last parse tree based at least in part on a current time descriptor and a temporal granularity descriptor associated with the input text string; and
arrange a first node of the last parse tree that represents a first time point and a second node of the last parse tree that represents a second time point.

10. The apparatus of claim 7, wherein the at least one non-transitory memory and the program code are configured to, with the at least one processor, cause the apparatus to further:
in response to determining that the last parse tree corresponds to the variance period:
determine a first node of last parse tree that represents a current interval based at least in part on a current time descriptor; and
determine a second node of the last parse tree that represents a comparison interval based at least in part on the current interval, wherein the comparison interval represents a same interval length as the current interval.

11. A computer-implemented method comprising:
receiving user query data comprising an input text string;
generating, based at least in part on the input text string, a n-gram set comprising a plurality of n-gram elements, wherein an arrangement of the plurality of n-gram elements in the n-gram set is determined based at least in part on a location of each n-gram element with respective to the input text string and a size of each n-gram element;
traversing each n-gram element in the n-gram set to generate a parse tree list comprising one or more parse trees based at least in part on a grammar template associated with the input text string;
generating, based at least in part on one or more of a node of a last parse tree of the parse tree list representing at least one stop word or joining a pair of non-contiguous nodes that represent temporal words in the last parse tree, one or more semantic frames indicating a temporal expression associated with the input text string, wherein the last parse tree comprises a plurality of nodes generated based at least in part on the grammar template;
providing, to a dimensional data model, the one or more semantic frames;
retrieving, by the dimensional data model, from a multi-dimensional database and based at least in part on the one or more semantic frames, one or more multi-dimensional data objects, wherein each multi-dimensional data object of the one or more multi-dimensional data objects is placed in a feature space, wherein the feature space comprises one or more dimensions corresponding to categorial data and measures representing numerical data represented by the multi-dimensional data object; and
generating, based at least in part on executing an analytic query on the one or more multi-dimensional data objects, an output response, wherein the analytic query is determined based at least in part on the temporal expression associated with the input text string.

12. The computer-implemented method of claim 11, wherein, prior to traversing each n-gram element in the n-gram set, the computer-implemented method further comprises:
retrieving, from a grammar database, the grammar template corresponding to the input text string, wherein the grammar template defines a grammar structure associated with the input text string.

13. The computer-implemented method of claim 11, wherein the grammar template is a context-free grammar.

14. The computer-implemented method of claim 11, further comprising traversing each n-gram element in the n-gram set according to the arrangement of the plurality of n-gram elements.

15. The computer-implemented method of claim 11, wherein, when traversing each n-gram in the n-gram set to generate the parse tree list, the computer-implemented method further comprising:
determining, for a n-gram element in the n-gram set, whether the grammar template defines a corresponding parse tree for the n-gram element; and based at least in part on determining that the grammar template defines the corresponding parse tree for the n-gram element, adding the corresponding parse tree to the parse tree list.

16. The computer-implemented method of claim 15, wherein the last parse tree of the parse tree list is defined by the grammar template for a largest n-gram element within the n-gram set.

17. The computer-implemented method of claim 11, wherein, when generating the one or more semantic frames, the computer-implemented method further comprising:
determining, based at least in part on the grammar template, whether the last parse tree corresponds to a time point, a time interval, or a variance period.

18. The computer-implemented method of claim 17, further comprising:
in response to determining that the last parse tree corresponds to the time point:
normalizing each node of the last parse tree; and
adding at least one inferred node to the last parse tree based at least in part on a current time descriptor and a temporal granularity descriptor associated with the input text string.

19. The computer-implemented method of claim 17, further comprising:
in response to determining that the last parse tree corresponds to the time interval:
normalizing each node of the last parse tree;
adding at least one inferred node to the last parse tree based at least in part on a current time descriptor and a temporal granularity descriptor associated with the input text string; and
arranging a first node of the last parse tree that represents a first time point and a second node of the last parse tree that represents a second time point.

20. The computer-implemented method of claim 17, further comprising:
in response to determining that the last parse tree corresponds to the variance period:
determining a first node of last parse tree that represents a current interval based at least in part on a current time descriptor; and
determining a second node of the last parse tree that represents a comparison interval based at least in part on the current interval, wherein the comparison interval represents a same interval length as the current interval.

21. A computer program product comprising at least one non-transitory computer-readable storage medium having computer-readable program code portions stored therein, the computer-readable program code portions comprising an executable portion configured to:
receive user query data comprising an input text string;
generate, based at least in part on the input text string, a n-gram set comprising a plurality of n-gram elements, wherein an arrangement of the plurality of n-gram elements in the n-gram set is determined based at least in part on a location of each n-gram element with respective to the input text string and a size of each n-gram element;
traverse each n-gram element in the n-gram set to generate a parse tree list comprising one or more parse trees based at least in part on a grammar template associated with the input text string;
generate, based at least in part on one or more of a node of a last parse tree of the parse tree list representing at least one stop word or joining a pair of non-contiguous nodes that represent temporal words in the last parse tree, one or more semantic frames indicating a temporal expression associated with the input text string, wherein the last parse tree comprises a plurality of nodes generated based at least in part on the grammar template;
provide, to a dimensional data model, the one or more semantic frames;
retrieve, by the dimensional data model, from a multi-dimensional database and based at least in part on the one or more semantic frames, one or more multi-dimensional data objects, wherein each multi-dimensional data object of the one or more multi-dimensional data objects is placed in a feature space, wherein the feature space comprises one or more dimensions corresponding to categorial data and measures representing numerical data represented by the multi-dimensional data object; and
generate, based at least in part on executing an analytic query on the one or more multi-dimensional data objects, an output response, wherein the analytic query is determined based at least in part on the temporal expression associated with the input text string.

22. The computer program product of claim 21, wherein, prior to traversing each n-gram element in the n-gram set, the computer-readable program code portions comprise the executable portion configured to further:
retrieve, from a grammar database, the grammar template corresponding to the input text string, wherein the grammar template defines a grammar structure associated with the input text string.

23. The computer program product of claim 21, wherein the grammar template is a context-free grammar.

24. The computer program product of claim 21, wherein the computer-readable program code portions comprise the executable portion configured to further traverse each n-gram element in the n-gram set according to the arrangement of the plurality of n-gram elements.

25. The computer program product of claim 21, wherein, when traversing each n-gram in the n-gram set to generate the parse tree list, the computer-readable program code portions comprise the executable portion configured to further:
determine, for a n-gram element in the n-gram set, whether the grammar template defines a corresponding parse tree for the n-gram element; and
based at least in part on determining that the grammar template defines the corresponding parse tree for the n-gram element, add the corresponding parse tree to the parse tree list.

26. The computer program product of claim 25, wherein the last parse tree of the parse tree list is defined by the grammar template for a largest n-gram element within the n-gram set.

27. The computer program product of claim 21, wherein the computer-readable program code portions comprise the executable portion configured to further:
determine, based at least in part on the grammar template, whether the last parse tree corresponds to a time point, a time interval, or a variance period.

28. The computer program product of claim 27, wherein the computer-readable program code portions comprise the executable portion configured to further:
in response to determining that the last parse tree corresponds to the time point:
normalize each node of the last parse tree; and add at least one inferred node to the last parse tree based at least in part on a current time descriptor and a temporal granularity descriptor associated with the input text string.

29. The computer program product of claim 27, wherein the computer-readable program code portions comprise the executable portion configured to further:
in response to determining that the last parse tree corresponds to the time interval:
normalize each node of the last parse tree;
add at least one inferred node to the last parse tree based at least in part on a current time descriptor and a temporal granularity descriptor associated with the input text string; and
arrange a first node of the last parse tree that represents a first time point and a second node of the last parse tree that represents a second time point.

30. The computer program product of claim 27, wherein the computer-readable program code portions comprise the executable portion configured to further:
in response to determining that the last parse tree corresponds to the variance period:
determine a first node of last parse tree that represents a current interval based at least in part on a current time descriptor; and
determine a second node of the last parse tree that represents a comparison interval based at least in part on the current interval, wherein the comparison interval represents a same interval length as the current interval.

* * * * *